(12) United States Patent
Crawley et al.

(10) Patent No.: US 6,442,304 B1
(45) Date of Patent: Aug. 27, 2002

(54) APPARATUS AND METHOD FOR PROTECTING DEVICES, ESPECIALLY FIBRE OPTIC DEVICES, IN HOSTILE ENVIRONMENTS

(75) Inventors: Charles M. Crawley, Danville, CA (US); Erhard Luther Edgar Kluth, Alresford (GB); Harvey N. Rutt, Southampton (GB); John Redvers Clowes, Alresford (GB); Malcom P. Varnham, Alresford (GB)

(73) Assignees: Chevron U.S.A. Inc., San Ramon, CA (US); Sensor Dynamics Limited, Winchester (GB); University of Southampton, Southampton (GB)

( * ) Notice: Subject to any disclaimer, the term of this patent is extended or adjusted under 35 U.S.C. 154(b) by 0 days.

(21) Appl. No.: 09/638,456

(22) Filed: Aug. 14, 2000

Related U.S. Application Data

(63) Continuation of application No. PCT/US99/30282, filed on Dec. 17, 1999.

(30) Foreign Application Priority Data

Dec. 17, 1998 (GB) ............................................. 9827735
Jan. 15, 1999 (GB) ............................................. 9900793

(51) Int. Cl.⁷ ................................................ G02B 6/00
(52) U.S. Cl. ........................................ 385/12; 385/125
(58) Field of Search ................................... 385/12, 125

(56) References Cited

U.S. PATENT DOCUMENTS

| | | | |
|---|---|---|---|
| 3,961,185 A | 6/1976 | Brokenshire et al. | ... 250/231 R |
| 4,612,810 A | 9/1986 | Martens | ........................ 73/705 |
| 5,304,171 A | * 4/1994 | Bregory et al. | |
| 5,371,720 A | 12/1994 | Cuomo | ........................ 367/149 |
| 5,373,576 A | * 12/1994 | Minns et al. | |
| 5,570,437 A | 10/1996 | Kluth et al. | ................... 385/12 |
| 5,582,064 A | 12/1996 | Kluth | ........................... 73/4 R |
| 5,804,713 A | 9/1998 | Kluth | ....................... 73/152.01 |

FOREIGN PATENT DOCUMENTS

| | | | |
|---|---|---|---|
| EP | 0 695 853 A2 | 2/1996 | ........... E21B/47/00 |
| EP | 0 774 565 A3 | 6/1998 | ........... E21B/47/00 |
| GB | 2 305 724 A | 4/1997 | ........... G01L/27/00 |
| GB | 2 311 546 A | 10/1997 | ........... E21B/23/08 |

* cited by examiner

*Primary Examiner*—Hung N. Ngo
(74) *Attorney, Agent, or Firm*—Richard J. Schulte

(57) ABSTRACT

The present invention relates to protecting optical devices, such as an optical fibre sensor connected in series with a cable, from a hostile environment, such as encountered when making measurements in oil and gas wells. A liquid can protect the optical device. Packaging an optical fibre sensor inside a capillary containing the liquid can provide this protection. The liquid can be liquid metal, gel, inks, grease or oil. The liquid metal can be gallium or indium, or an alloy that includes indium and/or gallium. The grease can contain lithium, molybdenum, or synthetics, or be synthetic grease. The liquid can contain other components such as a scavenger or getter for molecules and/or ions.

51 Claims, 20 Drawing Sheets

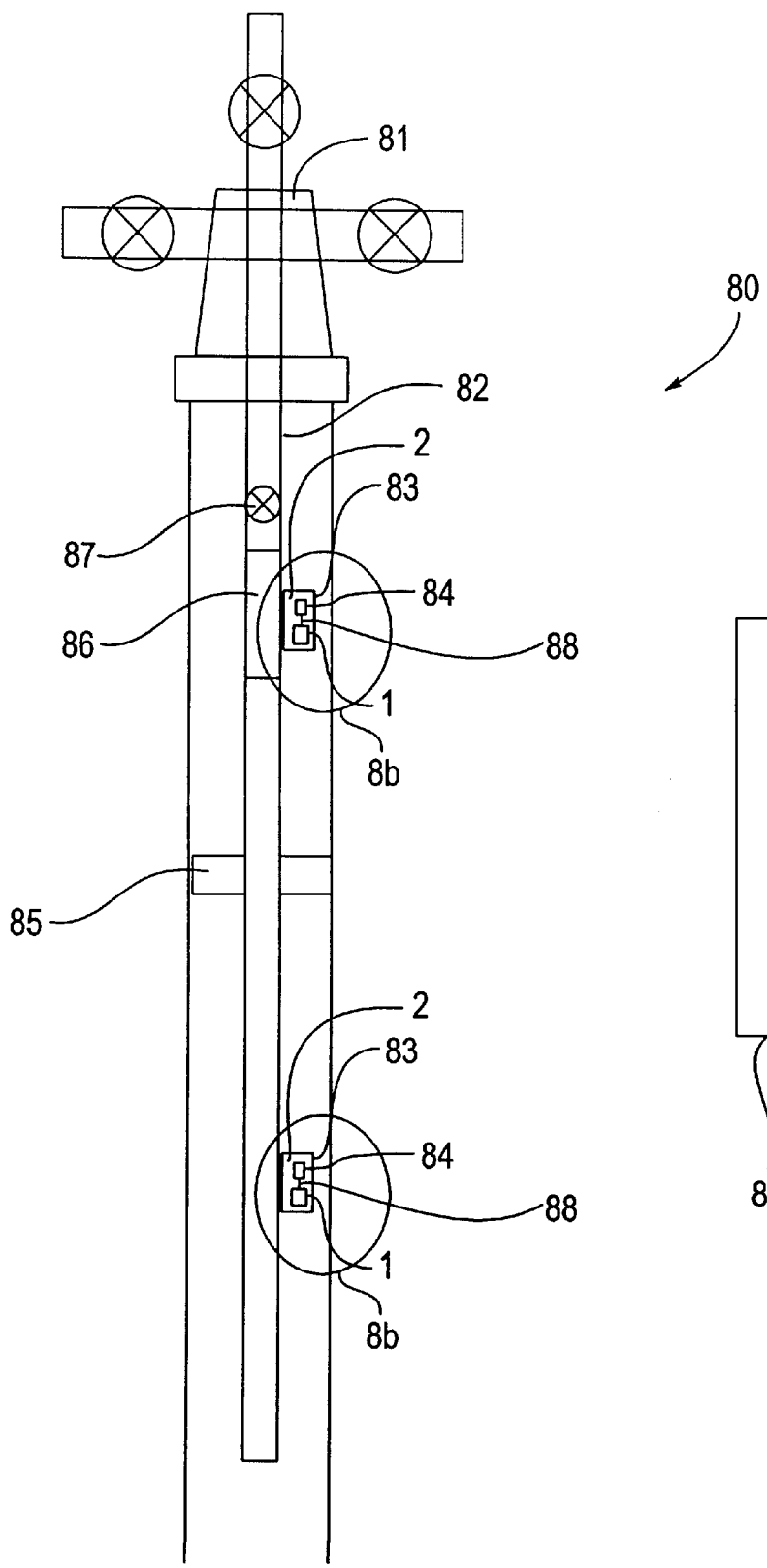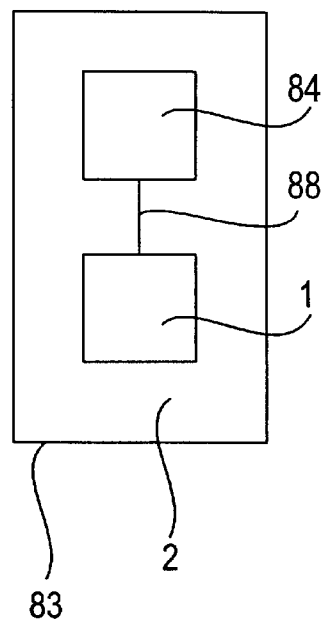
FIG. 8b
FIG. 8a

APPARATUS AND METHOD FOR PROTECTING DEVICES, ESPECIALLY FIBRE OPTIC DEVICES, IN HOSTILE ENVIRONMENTS

CROSS-REFERENCE TO RELATED APPLICATIONS

This application is a Continuation of International Application No. PCT/US99/30282, filed Dec. 17, 1999, which claims priority from United Kingdom Application No. GB9827735.3, filed Dec. 17, 1998 and from United Kingdom Application No. GB9900793.2, filed Jan. 15, 1999.

BACKGROUND OF THE INVENTION

This invention relates to apparatus and method for protecting devices in hostile environments. It has particular relevance for protecting optical fibre cables, transducers and components in oil, gas and geothermal wells.

In the normal production of oil and gas it is recognised that accurate and detailed information of the pressure and temperature in the oil and gas wells is important in order that adjustments can be made to flow rates and in order that preventive action can be taken to remedy damaging or potentially damaging conditions in the well. Similarly it is common practice for operators to stop the well from producing periodically, in order to observe the rate at which the downhole pressure changes after flow has been stopped. Accurate recording of the pressure profile provides the operator with valuable information regarding the condition of the well assembly and the condition of the region in the reservoir near the producing section of the well. The variation of the pressure during the period following cessation of production also helps to establish the physical extent of the region in the reservoir which is in pressure communication with the well. Furthermore, when electrical pumps are installed in oil wells in order to assist and speed up the rate of production, the knowledge of pressure and temperature along the pump is useful in adjusting the pump operating conditions such that undesirable conditions are avoided which can lead to damage to the pump assembly because repair and replacement can be extremely expensive.

Pressure sensors and temperature sensors are commercially available which are capable of being installed in the difficult conditions encountered in many oil and gas wells. Commonly used sensors are ones based on quartz transducers or silicon strain transducers. Such sensors generally have active electronic modules associated with them that must be located very near the transducers. Electrical cables then link the sensing assembly to the surface, providing electrical power for the sensor assembly and transmission of the sensor signal. It is well known that as oil is produced from deeper reservoirs, the downhole temperature and pressure increases and the sensor and sensor electronics have to survive under increasingly difficult conditions. The conditions are made all the more difficult as the surrounding environment contains water and many other reactive chemicals which react with the sensor assembly. Temperatures are often higher than 100 degrees Centigrade and can reach 200 degrees C or higher. Pressures encountered are often in excess of 10,000 psi and can exceed 20,000 psi.

Oil companies frequently have experienced failures of sensors under such conditions, sometimes within very short periods after installation and often within one or two years. Replacement of failed sensors or the associated cables and connectors is often economically impractical since it involves the shut-down of the well and requires expensive procedures to extract the sensor system from the well and to replace it.

Optical fibre sensors have been developed in order to overcome the short-comings of electronic sensors such as silicon based or quartz based gauges. Optical fibre gauges are passive devices that do not require active electronic assemblies near the measurement point. Generally optical fibres used for such purposes are made of silica which has a melting point near 2000 degrees Centigrade and which has many excellent engineering qualities. It is a very elastic material, with a very low coefficient of thermal expansion and remains elastic at pressures as high as 20,000 psi or greater. During the manufacturing process, optical fibres are coated with a protective material to prevent chemical attack of the silica which results in weakening of the fibre.

SensorDynamics has developed a fibre optic pressure sensor assembly consisting of a polariser, a pressure sensitive sidehole fibre and a mirror, all fusion spliced to an optical fibre lead. Such pressure sensors have been shown to have excellent performance features such as linearity, high resolution and survival at temperatures above 300 degrees C and at pressures in excess of 15,000 psi.

These sensors have a further and very important advantage derived from the fact that they are typically very thin and flexible. Optical fibres are typically between 100 microns and 500 microns in diameter, hence can be simply joined to optical fibre cables of similar diameter and can be deployed over many kilometres through hydraulic control lines using fluid drag. Hydraulic control lines typically have outside dimensions of ¼ inch and are frequently a feature of oil and gas wells and are used to control valves and chokes and also to inject chemicals or gas to assist the efficient production of reservoir fluids. More recently hydraulic control lines have been included in the construction of oil wells in order to provide a conduit through which optical fibre cables and sensors can be transported to the remote regions of the oil or gas well in order to acquire pressure, temperature and potentially other information. The ability to deploy sensors over long distances is important for many reasons. It removes the need for complicated electrical connectors or optical connectors in difficult locations along the well construction, allows different types of sensors to share the same control line conduit, allows other sensors to be added to the same network without interrupting the normal operation of the oil or gas well and, in the event of a sensor failure, makes replacement of sensor and cable practical and economically acceptable and recalibration possible and simple.

Whereas the optical fibre pressure sensors have displayed these excellent characteristics described above, they have all exhibited a rapidly changing zero point when exposed to a high temperature, high pressure environment which contains water in liquid phase, forming either the major component of the liquid material, or as a dissolved component in another liquid material. This zero point instability has been investigated extensively and it has been established that the rate of drift of the zero point is greater at higher temperatures and is faster when the pressure sensors are surrounded by water than if immersed in another fluid such as silicone and polysiloxane oils (such as Syltherm 800 Heat Transfer Liquid supplied by Univar plc) have shown that the drift of the zero point is caused by ingress of water or OH radicals into the silica body of the optical fibre, resulting in a highly stressed layer which starts to form at the surface of the optical fibre sensor and gradually extends inward. This stress layer has been shown to form in coated fibres as well as in uncoated silica fibres. Carbon coatings have been shown to slow down the formation of the stress layer. Stress layers alter the response of pressure sensors significantly and mask the true variation of pressure in the well. Where an in-fibre Bragg grating has been used as a pressure transducer, this drift has been shown to be as high as 30,000 psi, after a period of a few weeks or months, when exposed to water at 250° C. and 5000 psi pressure. In the case of a polarimetric sensor the change has been significantly lower but still resulted in a zero drift of 6000 psi under similar environmental conditions. Further measurements were carried out on commercially available, optical fibres and have established that the ingress of OH radicals causes the significant increase in the physical length and in the optical length of the fibres. Clowes et al. (see Electronics Letters, May 27$^{th}$ 1999, pages 926 to 927) reported changes greater than 0.1% in the physical length. Again it was found that carbon coatings that were developed to provide hermetic protection, to prevent the ingress of hydrogen into optical fibres employed in subsea communications cables, also reduce the rate at which the effect occurs. It has also been shown that no polymer coatings have been able to prevent the ingress of OH at 250° C. and 4000 psi in the presence of water. In many cases where coated, or uncoated fibres were exposed for periods of weeks or months, to fluids at high temperature and pressure, particularly under field test conditions it was observed that irregular solid deposits formed on the outside surface of the fibre structure. Sensors have also been shown to drift when immersed in polysiloxane oil and alcohols, but at less than 10% of the rate with water. Nonetheless, this drift rate is considered unacceptable for the accurate acquisition of downhole pressure data.

These observations have established that if optical fibres are to survive long-term at high temperatures and pressures in the presence of water, then it is essential to coat these fibres with a hermetic material which can block ingress of OH (or other molecules (methanol etc)) into silica under these conditions.

No polymer materials are known to us that can claim to provide such protection. Carbon coatings have proved their value under less extreme conditions and are known to provide long term protection for telecommunications optical cables which may be used in subsea links. Carbon coated optical fibres and fibre sensors have been tested under the more demanding conditions encountered in oil and gas production where they have shown moderate improvements, but have failed to achieve the degree of protection required by pressure sensors which are intended for use in hot, high pressure oil and gas wells. Metallic coatings such as gold, copper, tin have been shown to be hermetic. Metal coatings also promise the advantage over carbon, in that they are able to survive bending of the fibre without cracking which can lead to a breakdown of the hermetic seal. Metals are also able to survive at high temperatures. However, when coatings are to be used to protect pressure sensors, then the relatively high thermal coefficient of expansion of metals makes the pressure sensor more sensitive to changes in temperature. Furthermore, chemical reactions between the surrounding environment and the solid metal coating can also lead to a change in the stress and therefore can cause a change in the zero offset of the pressure sensor and therefore to a false indication of the pressure.

A solution that provides protection for optical fibres, optical fibre transducers and optical fibre components in oil, gas and geothermal wells may have widespread application for protecting other devices in hostile environments and may have general application in ensuring that different fluids do not mix. Hostile environments can be considered to be those environments that affect the performance and reliability of devices, especially optical and fibre-optic devices. Hostile environments are found in many process industries such as refineries, food processing, wood pulp processing, pharmaceutical production and the nuclear power industry. They are often characterised by high temperatures, high pressures and the presence of corrosive and/or aggressive fluids. An example of a highly-corrosive fluid is water at high temperatures and pressures (200C and 4000 psi). High-temperature water is found in many industrial processes.

The aim of this invention is to provide apparatus and method for protecting devices in hostile environments. A further aim is to improve the stability of sensors that are exposed to conditions of high temperature and pressure in the presence of hostile fluids, particularly fluids that may be encountered in downhole applications.

SUMMARY OF THE INVENTION

According to a non-limiting embodiment of the present invention, there is provided apparatus for protecting an optical device from a hostile environment, which apparatus comprises the optical device and a liquid wherein the liquid substantially surrounds the optical device.

The optical device can be selected from the group consisting of a transducer, a cable, an optical fibre cable, a region disposed about a splice in a cable, a region disposed about a splice between a cable and a transducer.

The liquid can be selected from the group consisting of liquid metal, gel, inks, grease and oil.

The grease can contain lithium, molybdenum, or synthetics, or be synthetic grease.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The ink can be a thin-film commercial ink such as an ink used in thick-film hybrid electronic circuit manufacture.

The liquid can contain other components such as a scavenger or getter for molecules and/or ions.

The apparatus can include a first container wherein the liquid is substantially contained within the first container. The first container can be a sealed container. The first container can be a capillary.

The apparatus can include a first and second container. The first container may be substantially contained within the second container. The second container can contain a second liquid or a second fluid. The second liquid may be the same material as the liquid surrounding the optical device.

In a preferred embodiment of the invention, there is provided apparatus for protecting an optical device from a hostile environment, which apparatus comprises the optical device, a liquid, a cable and a capillary, wherein the optical device is an optical fibre sensor connected in series with the cable.

The cable can be an optical fibre cable, the liquid can be gallium, the optical device can be an optical fibre sensor packaged inside a capillary containing the gallium. The capillary can extend over any splice region between the optical fibre sensor and the optical fibre cable, and the gallium preferably surrounds both the splice region (if present) and the optical fibre sensor.

The optical device can be a plurality of optical fibre sensors substantially surrounded by one or more liquids. The optical fibre sensors can be contained in at least one capillary.

The optical fibre sensor can be selected from the group consisting of an optical fibre pressure sensor, an optical fibre acoustic sensor, an optical fibre temperature sensor, an optical fibre seismic sensor, a distributed optical fibre temperature sensor, a distributed optical fibre pressure sensor, an optical fibre flow sensor, and an optical fibre sensor comprising at least one optical fibre Bragg grating.

In a second embodiment of the invention, there is provided apparatus for protecting a transducer from a hostile environment comprising the transducer and a liquid wherein the liquid substantially surrounds the transducer.

The transducer can be an optical transducer or can be an electrical transducer. The electrical transducer can be a pressure gauge such as a quartz pressure gauge used in downhole applications in the oil and gas industry.

The transducer can be an optical fibre sensor.

The transducer may be connected to a cable.

The liquid can be a liquid metal. The liquid metal can be gallium.

The liquid metal may be selected from the group comprising mercury, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The transducer can be packaged inside a first container wherein the liquid is substantially contained within the first container. The first container can be a sealed container.

The first container can be a first capillary that may be flexible. The first capillary may be substantially contained within a second capillary. The second capillary can contain a second liquid. The second liquid may be selected from the group consisting of a liquid metal, silicone oil, siloxane oil, polysiloxane oil, hydrocarbon oil, hydrocarbon fluid, grease and a gel.

In another aspect of the invention an optical device is protected from a hostile environment by a liquid substantially surrounding the optical device.

The optical device can be a transducer. The transducer may be installed in an oil, gas or geothermal well or other harsh environment.

The transducer can be an optical fibre transducer that may be connected in series with an optical fibre cable.

The liquid is a liquid metal selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

A capillary can be provided to contain the liquid and the optical fibre transducer which may be a pressure sensor.

Another aspect to the invention provides an optical fibre cable comprising an optical fibre, a liquid and a capillary wherein the optical fibre is contained within the capillary and the liquid surrounds the optical fibre.

The liquid can be selected from the group consisting of liquid metal, gel, inks, grease and oil.

The grease can contain lithium, molybdenum, or synthetics, or be synthetic grease.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

Another aspect to the invention provides an optical fibre splice comprising a first optical fibre, a second optical fibre, a fusion splice, a capillary and a liquid wherein the first and the second optical fibres are connected together at the fusion splice, and wherein the liquid surrounds the fusion splice and wherein the capillary contains the liquid around the fusion splice.

The liquid can be selected from the group consisting of liquid metal, gel, inks, grease and oil.

The grease can contain lithium, molybdenum, or synthetics, or be synthetic grease.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

Another aspect to the invention provides a transducer comprising an optical fibre transducer, a liquid and a capillary wherein the capillary contains the liquid and wherein the liquid surrounds the optical fibre transducer.

The liquid can be selected from the group consisting of liquid metal, gel, inks, grease and oil.

The grease can contain lithium, molybdenum, or synthetics, or be synthetic grease.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

A preferred embodiment of the present invention is an optical device placed in an oil, gas or geothermal well.

The oil, gas or geothermal well may contain a conduit extending from the surface to a measurement location. The optical device may be a transducer or an optical fibre cable.

The transducer may be connected in series with an optical fibre cable. The optical fibre cable and the transducer may be located within the conduit. The transducer may be located within the conduit by pumping the transducer along the conduit.

The invention also provides a method and an apparatus for separating two fluids by an interposing liquid. The interposing liquid may be a liquid metal.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

This embodiment is particularly attractive for communicating pressure between a first port and a second port or for segregating various sensing segments of a single highway. By highway we mean a conduit through which sensors and cables can be pumped, especially to remote locations such as found within oil, gas and geothermal wells. The conduit can be hydraulic steel control line, titanium control line, coiled tubing or other pipes and tubes which are used in the oil and gas industry. The conduit can also be ceramic tubing, plastic tubing, or tubing constructed from other materials such as synthetics.

The embodiment can be an apparatus for measuring pressure comprising a first port, a liquid metal and a pressure sensor in which the liquid metal transfers pressure from the first port to the pressure sensor.

The apparatus can comprise a first chamber, a pressure sensor, a capillary and a liquid metal, in which the pressure sensor is contained in the first chamber, which is connected to the location where pressure is to be measured by the capillary and the liquid metal.

The first chamber can contain an oil that may be chosen from the group silicone oil and polysiloxane oil.

The first chamber may contain a liquid metal.

The capillary may contain a liquid metal.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The apparatus may include a second chamber and a port to the measurement location. The second chamber may contain a liquid metal.

Another aspect to the invention provides a mirror formed on an optical fibre comprising the optical fibre and a liquid metal wherein the optical fibre has a cleaved end face and wherein the liquid metal is in contact with the cleaved end face of the optical fibre.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

Another embodiment of the present invention provides a sensor element comprising a transducer, a liquid coating and a container means for containing the liquid coating.

The liquid coating may be a liquid hermetic coating which reduces or prevents the ingress of molecules or ions such as water or OH groups, or hydrogen, into the silica of the optical fibre sensor.

The container means may be a capillary or any other form of container which ensures that the liquid coating remains in contact with the transducer. The container means may be made from a flexible material such as PTFE. It may be that the preferable container should be fabricated from silica in the form of a silica capillary, the dimensions of which are such that the total transducer package is flexible and deployable in the ¼" inch hydraulic control line. It is known that hermetic carbon coatings can be deposited onto silica fibres (and hence capillaries) during the drawing fabrication process. This provides an additional protection to the transducer package.

An additional benefit of the use of silica as the transducer and liquid container is that the physical bonding of the container to the silica fibre itself can be easily achieved through thermal fusion of the silica capillary to the silica fibre (a process commonly used in splicing of silica optical fibres). Other methods of physically bonding the capillary to the silica fibre include; the use of an adhesive, a metal with a melting point which is higher than the ambient temperature at which the sensor or cable is to be used or the formation of a mechanically strong bond between the capillary and the fibre through a process of tapering of the capillary to produce a narrow bore and hence close fit between capillary and the contained fibre.

The capillary may be open at the top or may be open at the bottom. Alternatively it may be closed at both ends.

The sensor element may be connected to an optical fibre cable which may be enclosed along the entire length (downhole) in the capillary in which case the capillary to fibre seal may be external to the oil well and securely sealed against pressure. The advantage of this approach is that the entire package may be of such dimensions that it may be placed inside a stainless steel control line and may be pumped to its measurement location and/or retrieved to the surface using fluid drag. Also this design would provide an hermetic seal and provide mechanical protection along the whole length of the fibre. The sensor element may be an optical fibre sensor. The sensor element may be a pressure sensor, a temperature sensor or an acoustic sensor.

The pressure sensor may be a polarimetric pressure sensor constructed from side-hole fibre (J Clowes et al, Photonics Technology Letters Volume 10, 1998) or polarisation-maintaining fibre, or may be a pressure sensor based upon a variable air gap with a capillary around it, or may be a pressure sensor based upon an optical fibre Bragg grating.

The liquid coating may be a metal that is in the liquid state at the temperatures where measurements are to be carried out. The metal may be mercury, indium, gallium or lead. The metal may be an alloy which includes indium and gallium, or indium, gallium and tin, or indium, bismuth and tin, or bismuth, lead and cadmium, or silicon, lead, tin, cadmium and silver.

Any of the metals or alloys may have other compounds added which act as scavengers or getters for molecules or ions such as water or OH, or hydrogen, or others.

The liquid coating may be a grease. The grease may contain lithium, or a combination of lithium and molybdenum.

The grease may have compounds added which act as scavengers or getters for such molecules or ions as water, or OH groups, or hydrogen or others.

In an embodiment of the present invention, the sensor element is of such dimensions and structure that it may be placed inside a conduit. The conduit may be a hydraulic control line such as ¼" hydraulic control line commonly used in the oil and gas production industry.

The conduit may be part of an apparatus for extracting at least one of oil and gas from below ground, which apparatus includes a well head, a production tubing, a conduit, a cable and a sensor element in which the sensor element comprises a transducer, a liquid coating and a container means for containing the liquid coating.

The sensor element and the cable may have been pumped along the conduit.

DESCRIPTION OF THE DRAWINGS

Embodiments of the present invention will now be described solely by way of example and with reference to the accompanying drawings in which:

FIGS. 8a and 8b are diagrams showing

DETAILED DESCRIPTION

According to a non-limiting embodiment of the present invention, there is provided apparatus for protecting an optical device 1 from a hostile environment, which apparatus comprises the optical device 1 and a liquid 2, wherein the liquid 2 substantially surrounds the optical device 1.

The optical device 1 can be selected from the group consisting of a transducer, a cable, an optical fibre cable, a region disposed about a splice in a cable, a region disposed about a splice between a cable and a transducer.

The liquid 2 can be selected from the group consisting of liquid metal, gel, inks, grease and oil.

The grease can contain lithium, molybdenum, or synthetics, or be synthetic grease.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The liquid 2 can contain a scavenger that may be selected from the group consisting of lithium and sodium.

Figure 1:
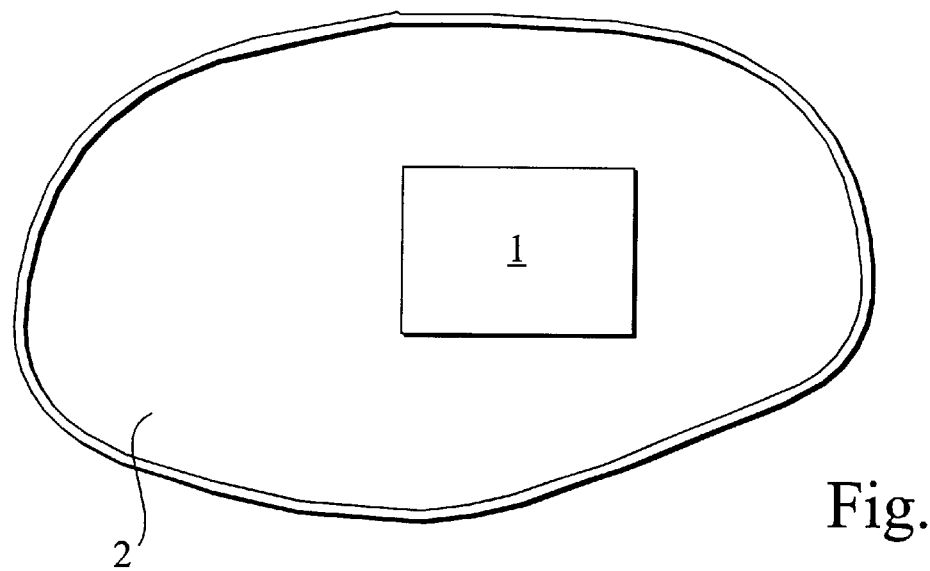
FIG. 1 is a diagram of an embodiment of the present invention.
Figure 2:
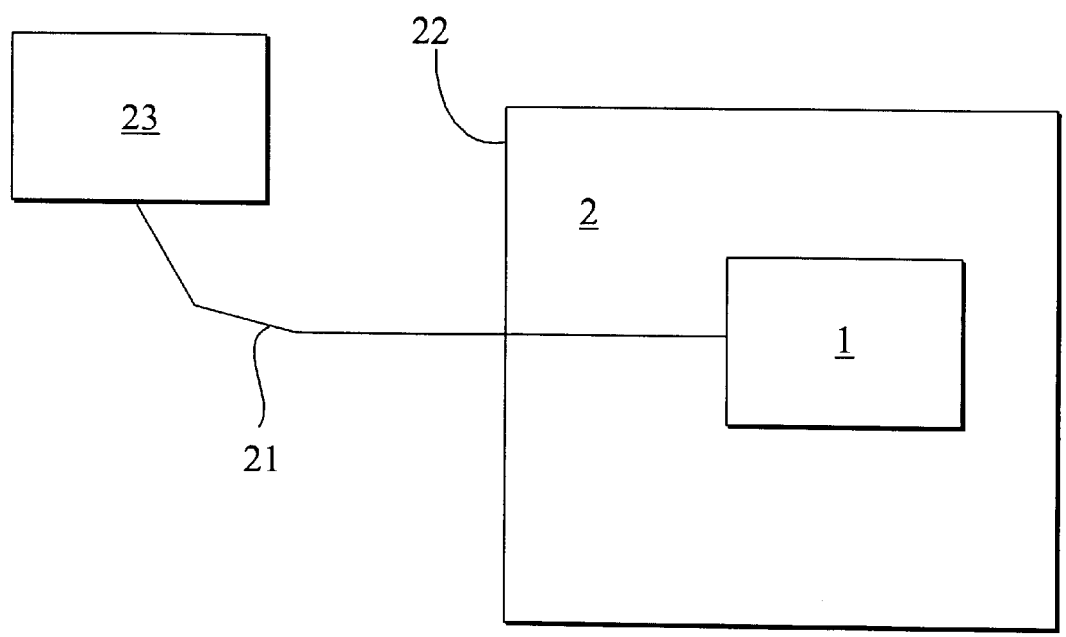
FIG. 2 is a diagram showing an optical device in a container.

FIG. 2 shows an embodiment of the invention comprising the optical device 1, the liquid 2, a first container 22, a cable 21 and some instrumentation 23. The liquid 2 is contained within the first container 22. The cable 21 connects the optical device 1 with the instrumentation 23.

The first container 22 can be a sealed container, an unsealed container and can be a capillary.

The apparatus may include a first container 22 and a second container (not shown). The second container can contain a second liquid. The second liquid may be the same material as the liquid 2 surrounding the optical device 1.

Figure 3:
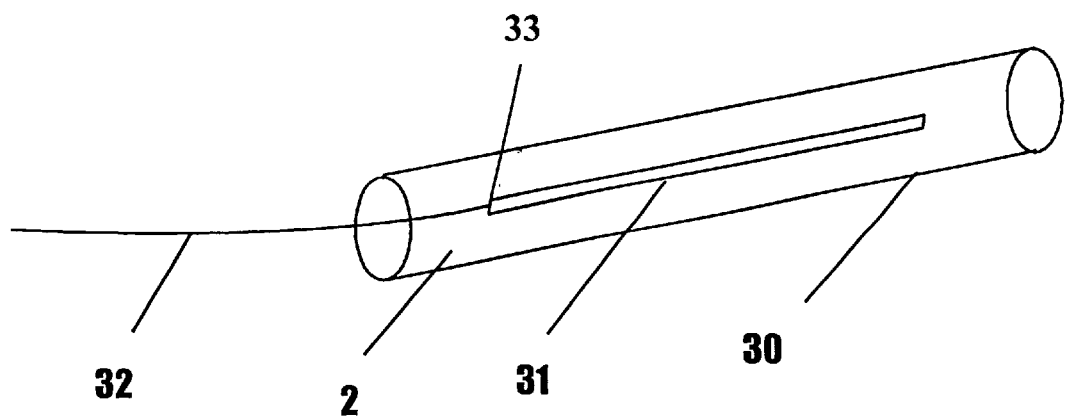
FIG. 3 is a diagram showing an optical fibre sensor.

FIG. 3 shows a preferred embodiment of the invention, comprising an optical fibre sensor 31 surrounded by the liquid 2, a cable 32 and a container 30.

The cable 32 is preferably an optical fibre cable connected in series with the optical fibre sensor 31, and the liquid 2 is preferably a liquid metal. The container 30 is preferably a capillary that extends over any splice region 33 between the optical fibre sensor 31 and the optical fibre cable. The liquid metal preferably surrounds both the splice region 33 (if present) and the optical fibre sensor 31.

The embodiment extends to a plurality of optical fibre sensors 31 substantially surrounded by one or more liquids 2. The optical fibre sensors 31 can be contained in at least one container 30.

The optical fibre sensor 31 can be selected from the group consisting of an optical fibre pressure sensor, an optical fibre acoustic sensor, an optical fibre temperature sensor, an optical fibre seismic sensor, a distributed optical fibre temperature sensor, a distributed optical fibre pressure sensor, an optical fibre flow sensor, an optical fibre strain sensor and an optical fibre sensor comprising at least one optical fibre Bragggrating. Examples of optical fibre sensors can be found in the proceedings of the international conference on optical fibre sensors which is held on a regular basis.

Although FIG. 3 refers to an optical fibre sensor 31, the invention applies equally to the protection of any transducer, optical, electrical, piezoelectric or otherwise. For example the transducer can be an optical transducer or can be an electrical transducer. The electrical transducer can be a pressure gauge such as a quartz pressure gauge used in downhole applications in the oil and gas industry.

Figure 4:
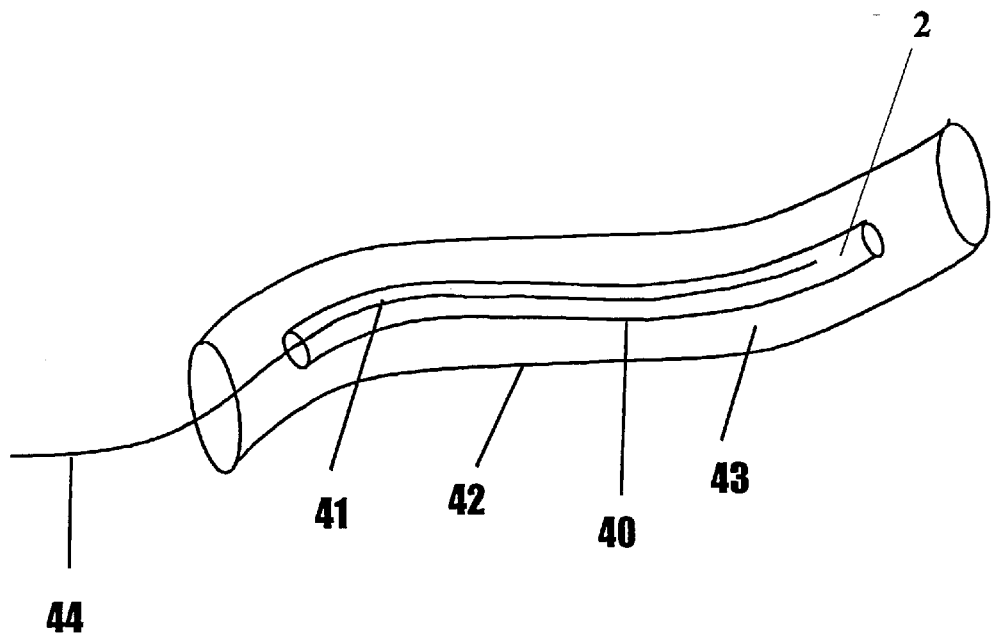
FIG. 4 is a diagram showing a transducer in a first and second container.

FIG. 4 shows a transducer 41 packaged in a first container 40 and a second container 42. The first container contains the liquid 2 and the second container contains a second fluid 43.

The transducer 41 can be the optical fibre sensor 31 shown in FIG. 3.

The transducer 41 may be connected to a cable 44.

The liquid 2 can be a liquid metal which can be gallium.

The second fluid 43 is preferably a liquid selected from the group consisting of liquid metal, gel, grease and oil and may be the same material as the liquid 2. The second fluid 43 may also be a gas such as nitrogen.

The liquid metal may be selected from the group comprising mercury, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The first container 40 can be a sealed or an unsealed container. The first container 40 can be a first capillary that may be flexible.

The second container 42 can be a sealed or an unsealed container. The second container 42 can be a second capillary. The second container 42 can be a long length of conduit, pipe or hydraulic control line extending to a remote location such as an oil, gas, sulphur or geothermal well. The second container 43 may also be a plastic conduit extending to remote regions in a refinery complex or industrial process facility.

The second fluid 43 can be selected from the group consisting of a liquid metal, silicone oil, siloxane oil, polysiloxane oil, hydrocarbon oil, hydrocarbon fluid, grease and a gel.

Figure 5:
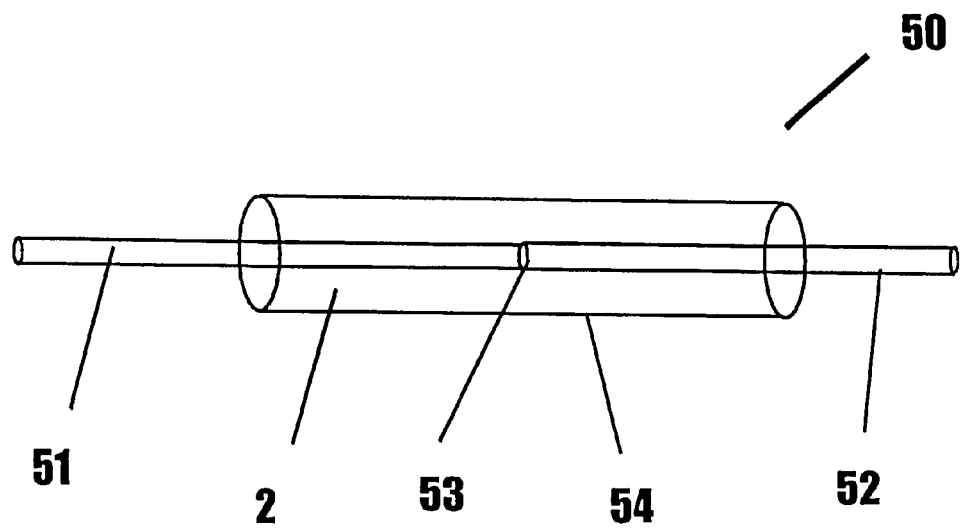
FIG. 5 is a diagram showing a splice.

FIG. 5 shows an optical fibre splice 50 comprising a first optical fibre 51, a second optical fibre 52, a splice 53, a container 54 and the liquid 2 wherein the first and the second optical fibres 51, 52 are connected together at the splice 53, and wherein the liquid 2 surrounds the splice 53 and wherein the container 54 contains the liquid 2 around the splice 53.

The liquid 2 can be selected from the group consisting of liquid metal, gel, inks, grease and oil.

The grease can contain lithium, molybdenum, or synthetics, or be synthetic grease.

The liquid metal can be selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The container 54 can be a capillary.

The splice 53 can be a fusion splice.

Figure 6:
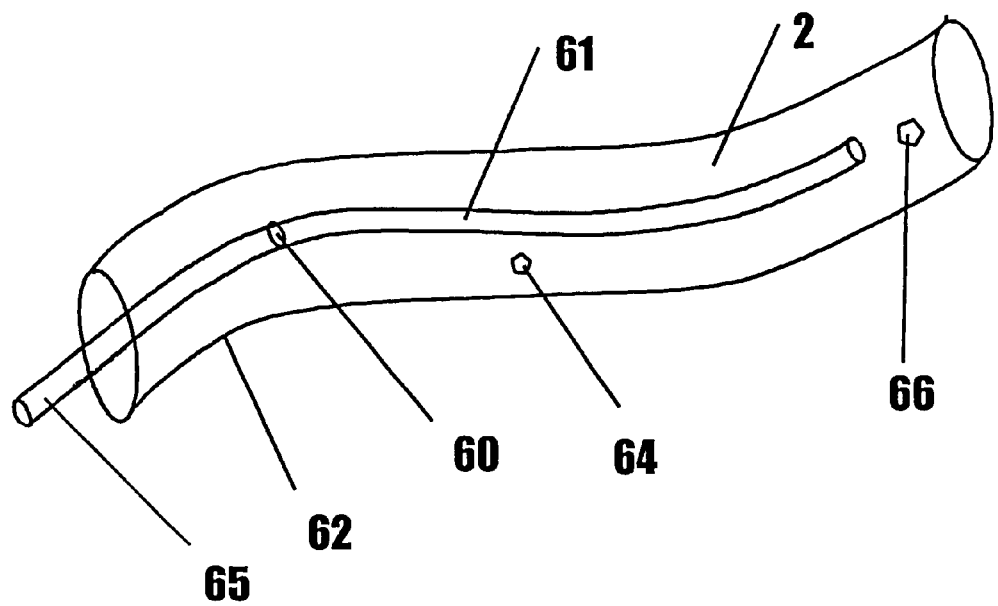
FIG. 6 is a diagram showing a splice between a cable and a transducer.

FIG. 6 shows a transducer 61 connected to a cable 65 at a joint 60, surrounded by the liquid 2 and packaged in a container 62.

The transducer 61 can be an optical fibre transducer such as the optical fibre sensor 31 and the container 62 can be a capillary.

The liquid 2 can be selected from the group consisting of liquid metal, gel, inks, grease and oil.

The grease can contain lithium, molybdenum, or synthetics, or be synthetic grease.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The cable 65 can be an optical fibre cable and the joint 60 can be a splice such as a fusion splice between an optical fibre sensor and an optical fibre cable.

The fluid 2 may also contain at least one scavenger 64 or at least one getter 66. Scavenging or gettering additions can be added to liquids to remove any oxygen, hydrogen or water molecules that may enter the liquid in small quantities. Removing these molecules will further improve the effectiveness of the liquid in reducing or preventing ingress of these molecules into the structure of the transducer 61 or cable 65. Non-limiting examples of the scavenger 64 or the getter 65 include elements from Group I (Li, Na, K, Rb, Cs, but most likely Li or Na but excluding hydrogen). Alternately candidates include elements from Group II (Be, Mg, Ca, Sr, Ba, but most likely Mg or Ca).

Figure 7:
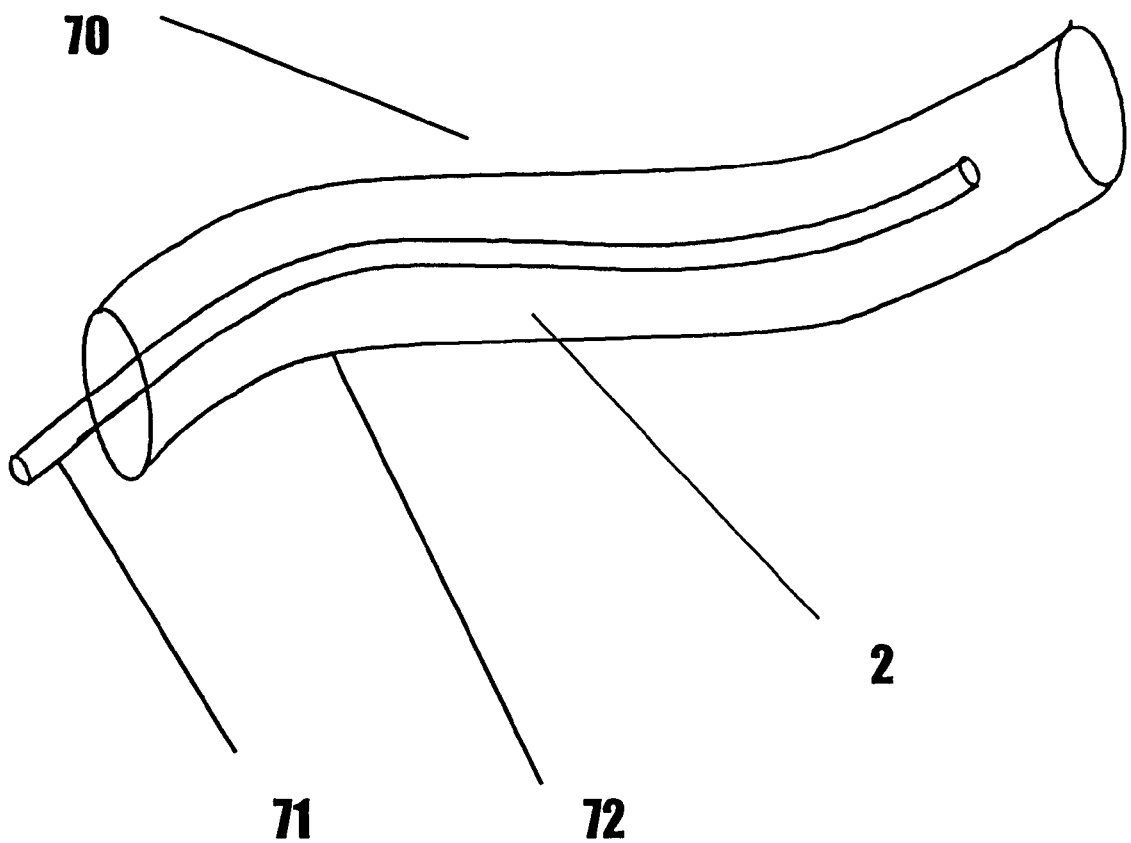
FIG. 7 is a diagram showing an optical fibre cable.

FIG. 7 shows an optical fibre cable 70 comprising an optical fibre 71, the liquid 2 and a container 72. The liquid 2 surrounds the optical fibre 71 protecting it from harsh environments. This embodiment is believed to have particular application in oil, gas and geothermal wells.

The liquid 2 can be selected from the group consisting of liquid metal, gel, inks, grease and oil.

The grease can contain lithium, molybdenum, or synthetics, or be synthetic grease.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The container 72 can be a capillary or may be a length of conduit such as high-pressure control line or plastic tubing or piping.

FIG. 8a shows an optical device 1 placed in a well 80 for producing oil, gas or geothermal energy FIG. 8b shows an enlarged view including device 1. The well 80 comprises a well head 81, a production string 82 through which oil, gas or geothermal energy rises to the surface. The optical device 1 is surrounded by the liquid 2 within a container 83. Also shown is a communication device 84 for storing or transmitting data that is connected to the optical device 1 by a connecting link 88.

The communication device 84 may be a cable, a radio link, an infra-red link or a data recorder device.

The well 80 may contain a packer 85, or a submersed pump 86 or a downhole safety valve 87, or a combination of these devices.

The well 80 may contain more than one optical device 1.

Figure 9:
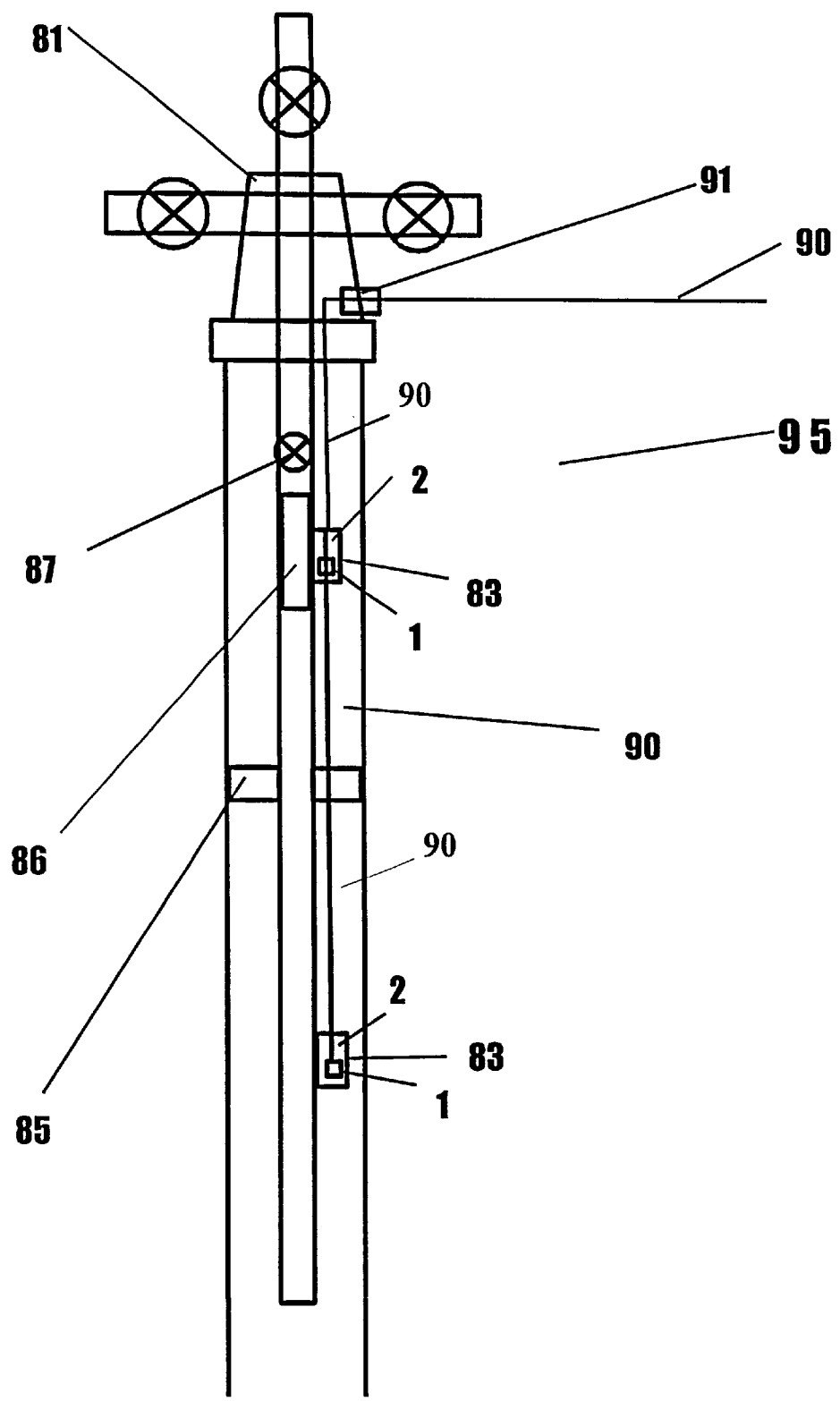
FIG. 9 is a diagram of a well containing a cable.

FIG. 9 shows a well 95 for producing oil, gas or geothermal energy. The well 95 includes a cable 90 for communicating to the optical device 1. The optical device 1 can be the optical fibre sensor 31 and the cable 90 can be an optical fibre cable. The cable 90 exits the well head at a penetrator 91.

The penetrator 91 can be a high-pressure penetrator or an orifice depending on the conditions experienced at the well head 81

Figure 10:
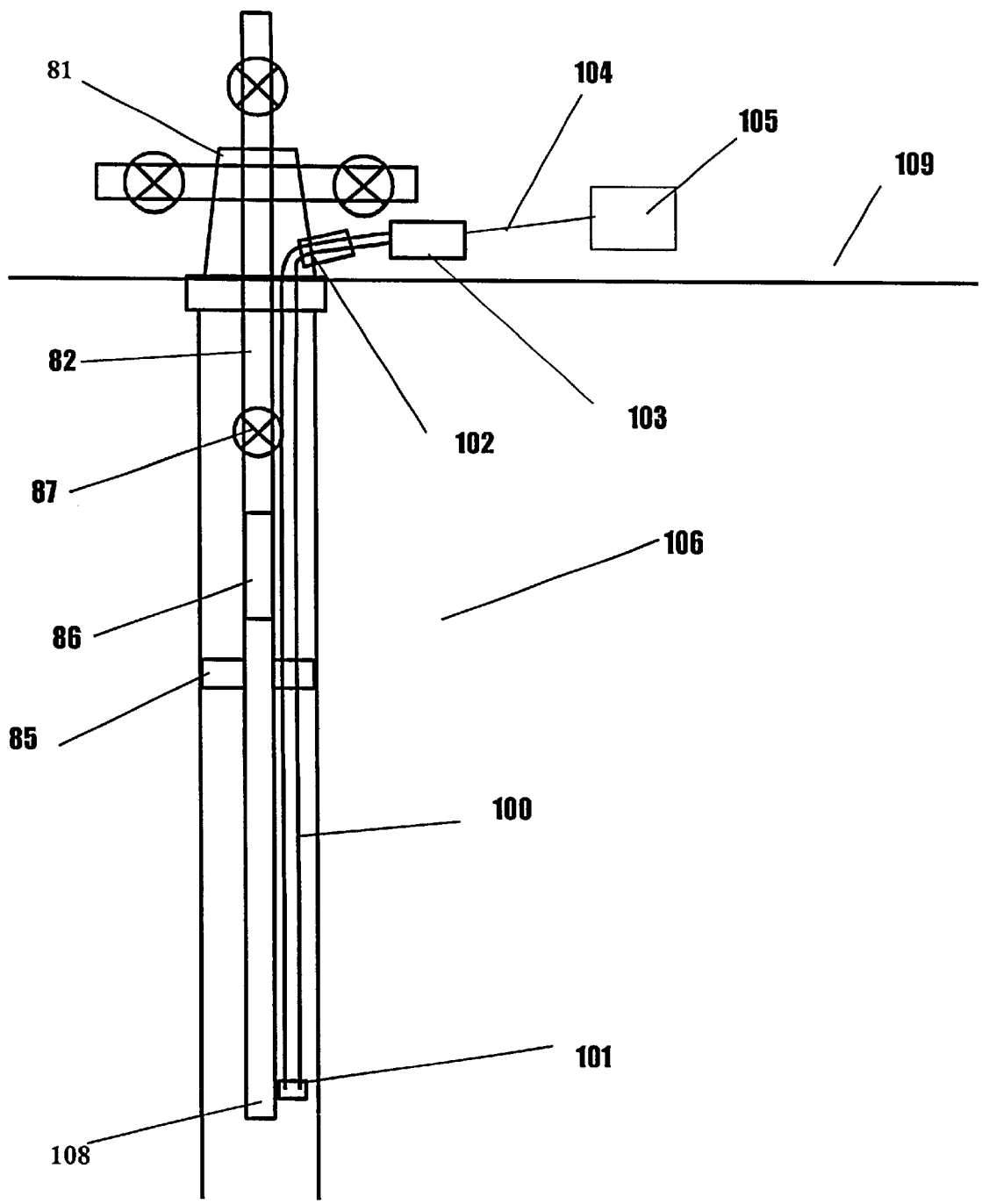
FIG. 10 is a diagram of a well containing a conduit.

FIG. 10 shows a well 106 for producing oil, gas or geothermal energy. The well 106 contains a conduit 100 extending from the surface 109 to a measurement location 108. The conduit 100 is a return conduit which extends from the surface 109 to the measurement location 108 and back to the surface 109.

The conduit 100 penetrates the well head 81 at a penetrator 102.

The optical device 1 (not shown) is located within the conduit 100.

The optical device 1 is preferably the optical fibre sensor 31 connected in series with an optical fibre cable 1001 (not shown). The optical fibre cable 1001 connects to instrumentation 105 via an optical cable 104 and an exit means 103.

The exit means 103 may be a high-pressure seal around an optical fibre. The exit means 103 can also be the end of the conduit 100.

The optical fibre sensor 31 and the optical fibre cable 1001 may be of such dimensions and construction that they may be pumped by a pumping fluid 107 (not shown) along the conduit 100. The pumping fluid 107 may be the fluid 2 for protecting the optical fibre sensor 31 and the optical fibre cable 1001.

In the event that the optical fibre sensor 31 is a pressure sensor or a chemical composition sensor, a communication port 101 can be provided for communicating between the conduit 100 and the measurement location 108. The communication port 101 can be a valve or an orifice.

Figure 11:
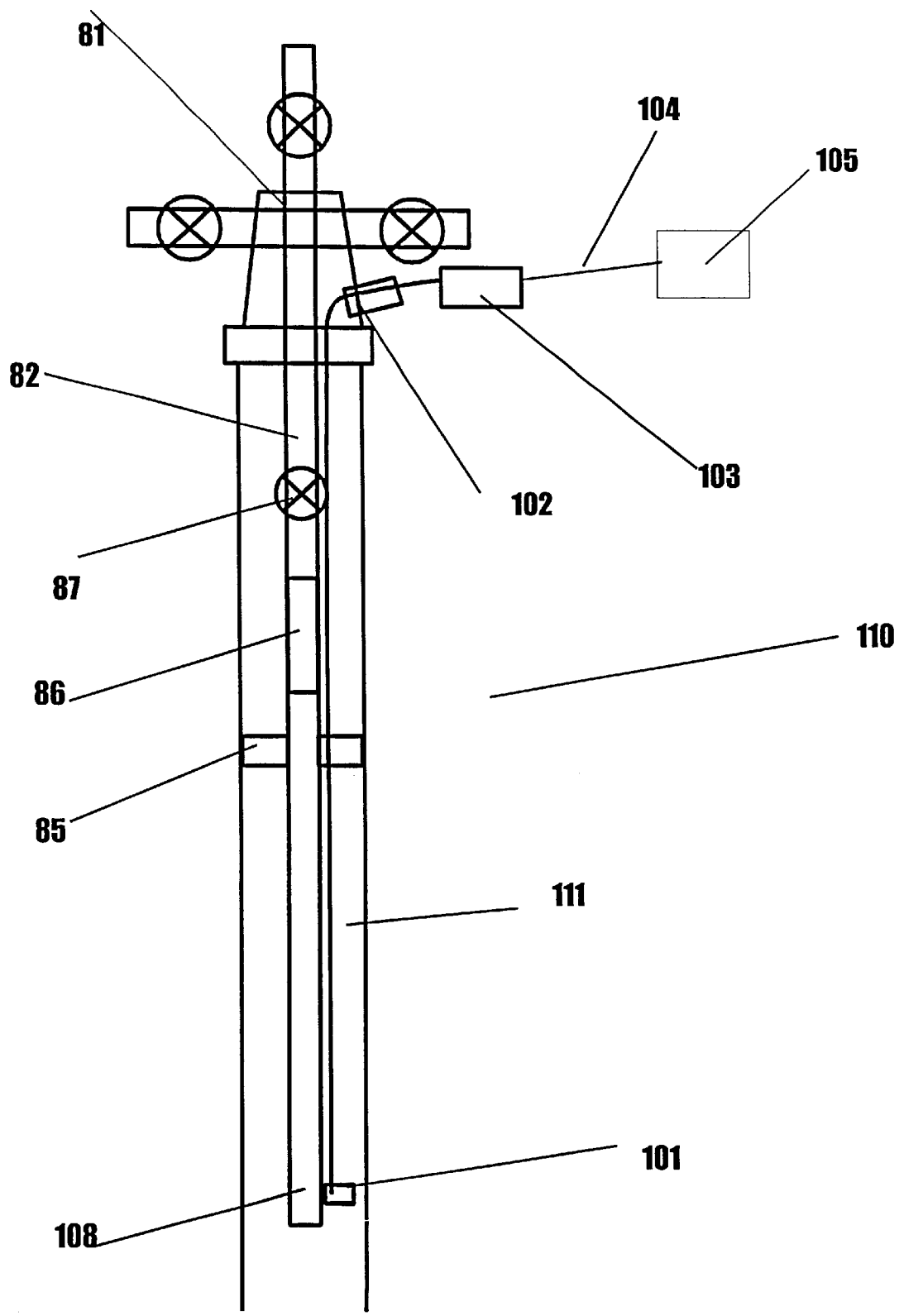
FIG. 11 is a diagram of a well containing a one-way conduit.

FIG. 11 shows a well 110 for producing oil, gas or geothermal energy. The well 110 has a one-way conduit 111 containing an optical device 1 (not shown) surrounded by the fluid 2 (not shown).

Figure 12:
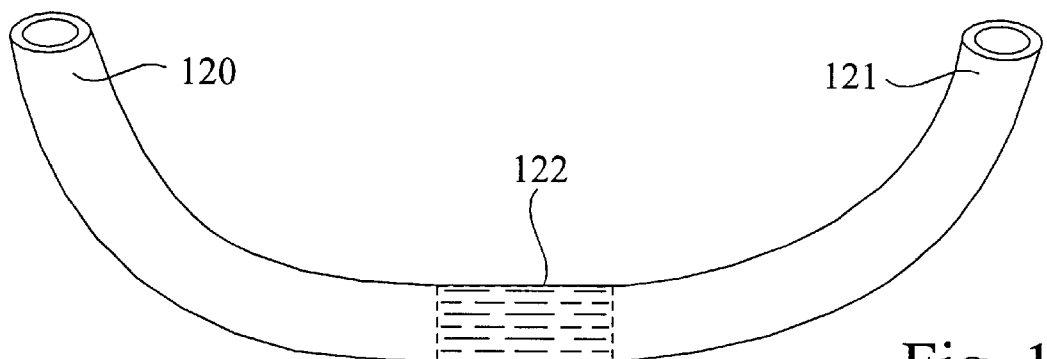
FIG. 12 is a diagram showing a fluid separating a first port and a second port.

FIG. 12 shows a first port 120, a second port 121 and a fluid 122. The apparatus is useful for isolating fluids on either side of the fluid 122.

The fluid 122 may be a liquid metal.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

This embodiment is particularly useful for communicating pressure between the first port 120 and the second port 121.

Figure 13:
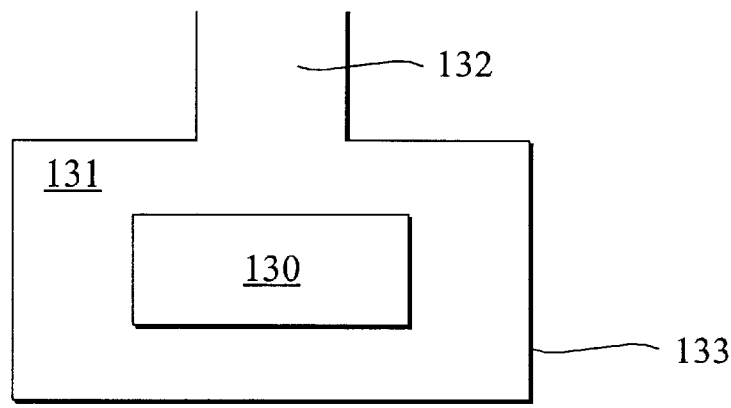
FIG. 13 is a diagram showing pressure being communicated to a pressure sensor by a liquid metal.

FIG. 13 comprises a first port 132, a liquid metal 131 and a pressure sensor 130 within a container 133 in which the liquid metal 131 transfers pressure from the first port 132 to the pressure sensor 130.

The container 133 can be a chamber.

The pressure sensor 130 can be an optical fibre pressure sensor, a quartz gauge, a pressure sensor based on a diaphragm of silicon, or an electrical pressure sensor.

Figure 14:
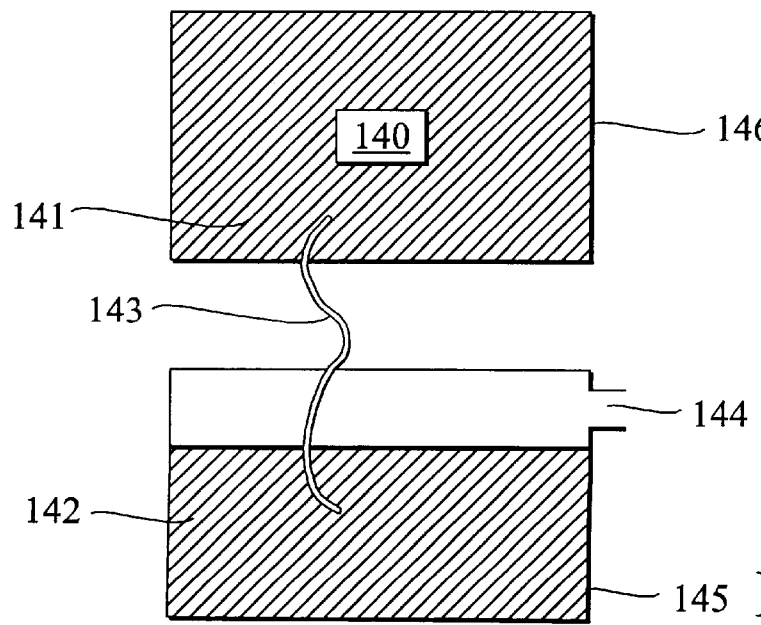
FIG. 14 is a diagram showing a pressure sensor in a first chamber connected to a second chamber by a capillary.

FIG. 14 comprises a first port 144, a first chamber 146 containing a first fluid 141 and a pressure sensor 140, a second chamber 145 containing a second fluid 142 and a capillary 143 connecting the first chamber 146 and the second chamber 145.

The first fluid 141 can be a liquid metal.

The second fluid 142 can be a liquid metal.

The first chamber 146 can contain an oil that may be chosen from the group silicone oil and polysiloxane oil.

The capillary 143 can contain a liquid metal.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

Figure 15:
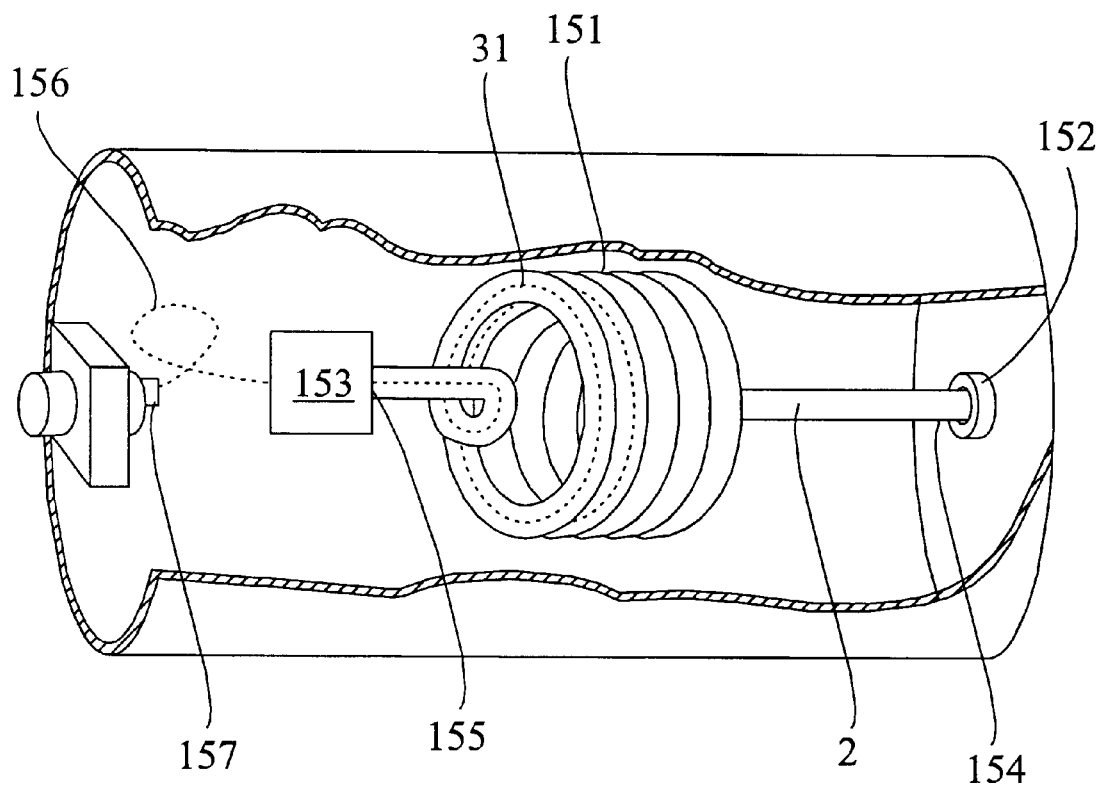
FIG. 15 is a diagram showing a packaging scheme for optical fibre sensors.

FIG. 15 shows a packaging scheme for the optical fibre sensor 31. The optical fibre sensor 31 is contained within a high-pressure tubing 151 such as hydraulic control line. The hydraulic control line 151 contains the fluid 2. The high-pressure tubing 151 contains a communication port 152 at a first end 154 such as a hydraulic fitting, diaphragm, orifice, bellows, or a valve and a pressure seal 153 at a second end 155. A cable 156 penetrates through the seal 153 to a connector 157.

The connector 157 can be a fibre optic connector commonly used in the telecommunications industry.

This packaging scheme provides a convenient and safe implementation for application in the oil industry.

The optical fibre sensor 31 may be packaged with at least one capillary containing at least one fluid, for example as described in FIGS. 3, 4 and 6. The innermost capillary can contain liquid metal and an oil or grease can be used to buffer the liquid metal from production or process fluids such as are found in oil, gas and geothermal wells, process plants or refineries. The liquid metal can be gallium.

Figure 16:
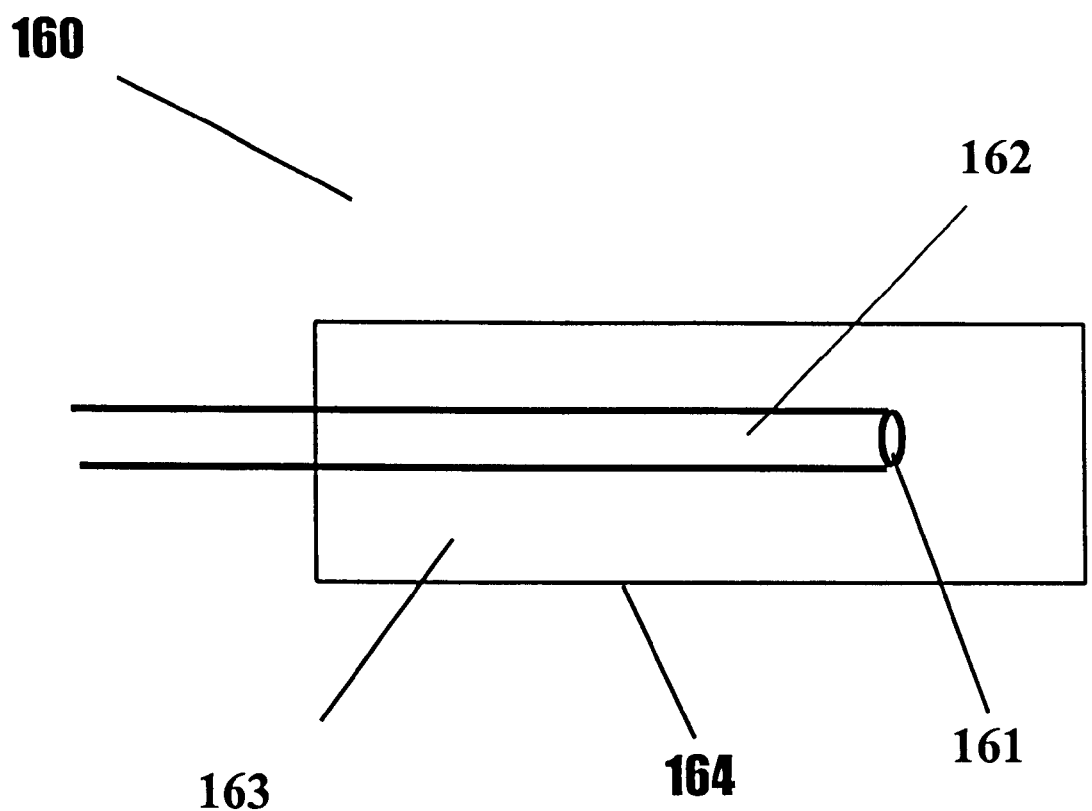
FIG. 16 is a diagram showing a mirror.

FIG. 16 shows a mirror 160 formed by the cleaved end face 161 of an optical fibre 162 immersed into a liquid metal 163 in a container 164.

The liquid metal can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium. Gallium has been found to be a preferable choice of liquid metal 163 for applications in hostile environments.

Figure 17:
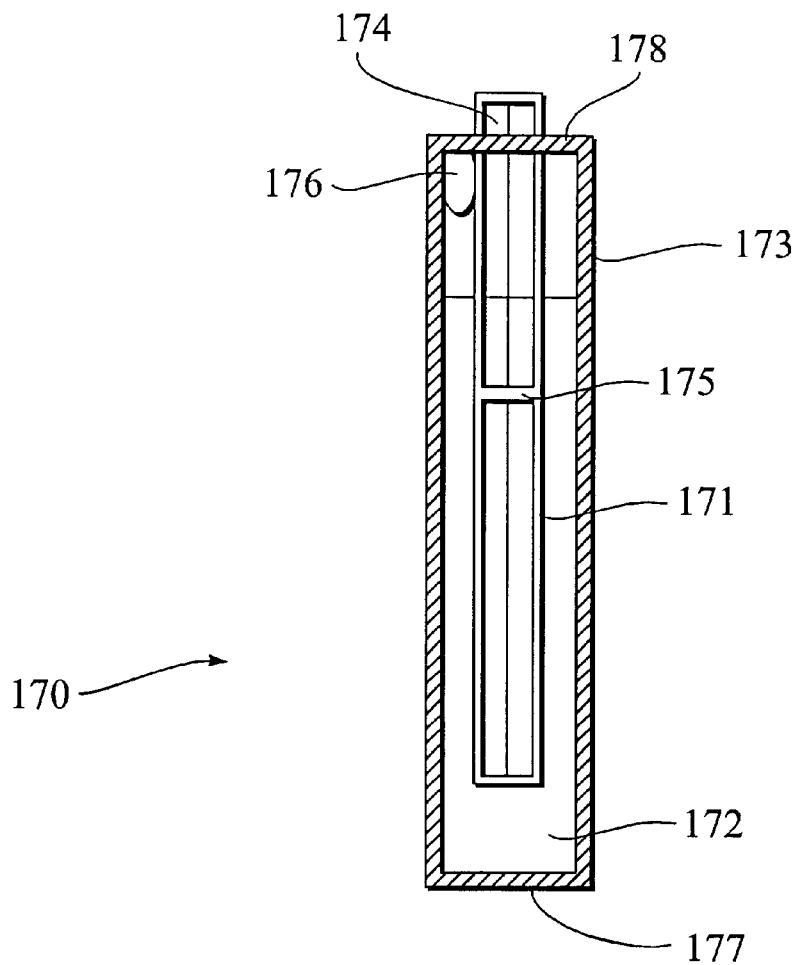
FIG. 17 is a diagram showing sensor element surrounded by a liquid coating.

With reference to FIG. 17, a sensor element 170 comprises an optical fibre sensor 171, a liquid coating 172 and a container means 173 for containing the liquid coating 172. The optical fibre sensor 171 is shown joined to an optical fibre cable 174 at a splice 175. The container means 173 is shown attached to the optical fibre cable 174 using a fixing means 176, in a manner that does not seal the container means 173. The container means 173 in this diagram is shown as closed at both a first end 177 and a second end 178. However the container means 173 can be open at either or both the first and second ends 177 and 178. The liquid coating 172 surrounds the optical fibre transducer 171 and the splice 175.

The container means 173 can be a container or a capillary which may be slotted or contain one or more perforations. The capillary can be flexible or rigid. Flexible capillaries include capillaries constructed from thin-walled silica or other glasses, polytetrafluoroethylene or other plastics, or thin-walled metals. A suitable thin-walled capillary for packaging the optical fibre sensor 171 can be between 150 microns to 2 mm diameter with wall thickness compatible with inserting the optical fibre sensor 171, retaining flexibility and leaving sufficient space for the liquid coating 172. Rigid capillaries can be constructed from similar materials including stainless control lines commonly used for high-pressure tubing.

The fixing means 176 can be an adhesive, a solder, a clamp, or any other material that can attach the optical fibre cable 174 to the container means 173.

The liquid coating 172 can be a liquid hermetic coating acting as a hermetic seal to prevent the ingress of foreign molecules or ions, such as water or OH groups, or hydrogen, or others into the optical fibre sensor 171. The optical fibre sensor 171 can be constructed from silica-based optical fibre components, soft-glass-based optical fibre components, or sapphire-based optical fibre components. These materials are typically doped during manufacture to form waveguiding structures.

Figure 18:
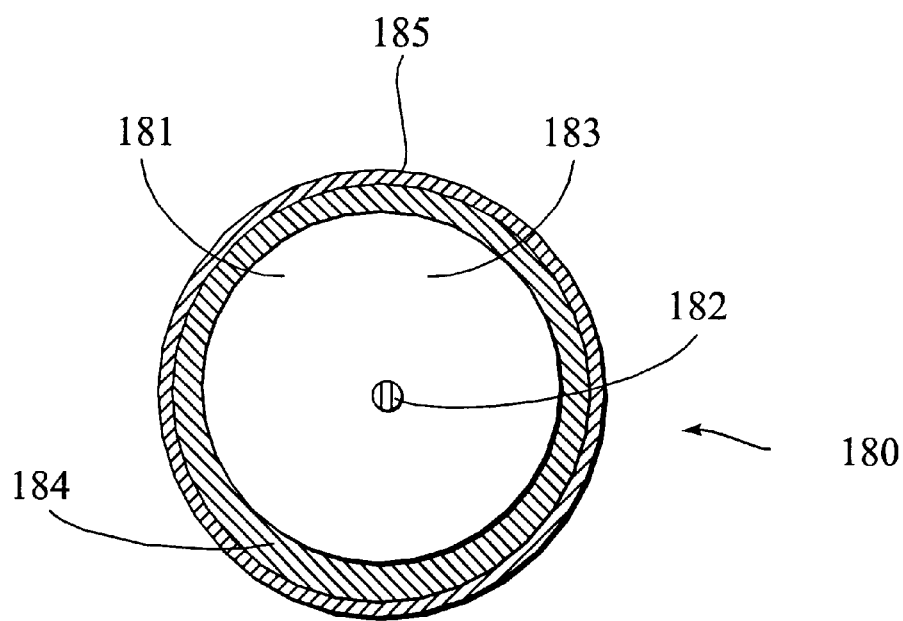
FIG. 18 is a diagram showing a cross-section of a sensor element.

FIG. 18 shows an optical fibre sensor 180 comprising an optical fibre 181 comprising a core 182 and a cladding region 183 surrounded by a liquid coating 184 to reduce or prevent the ingress of foreign molecules or ions, including water and OH groups and others into the interior of the optical fibre 181. The liquid coating 184 is in a container 185 that serves to keep the liquid coating 184 in place.

The optical fibre 181 can include a single or multiple coatings around the cladding region 183. Typical coatings include plastic, carbon and metal coatings. Plastic coatings include acrylate, silicone, polyimide, polyamide, nylon, polytetrafluoroethylene. Metal coatings include gold, silver, nickel, copper, and alloys containing gold, silver, copper or nickel.

The liquid coating 184 can be selected from the group consisting of liquid metal, gel, inks, grease and oil.

The grease can contain lithium, molybdenum, or synthetics, or be synthetic grease.

The liquid metal can be selected from the group comprising mercury gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

The liquid metal can be a metal that is in the solid state at room temperatures but is in the liquid state when being used.

The grease can be a grease designed for use at high temperatures and which is resistant to water at high temperatures. The grease may be a lithium grease or a lithium grease with molybdenum, both commonly used in protecting bearings in machinery.

Figure 19:
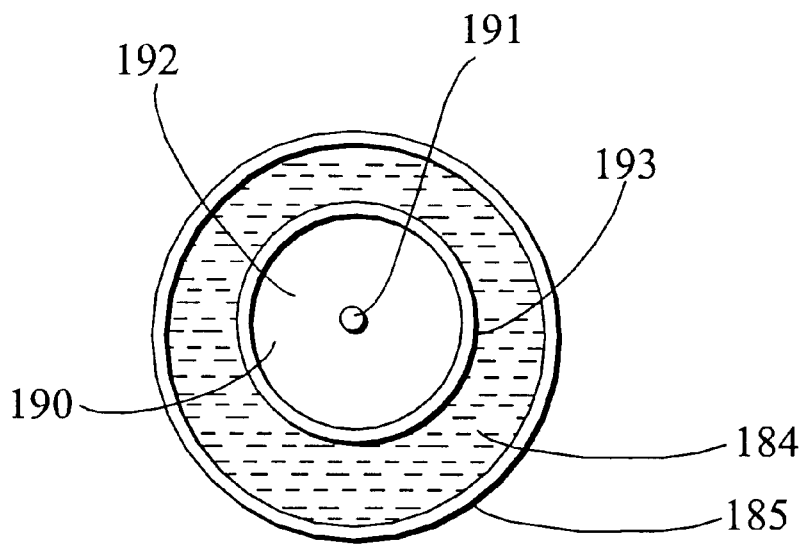
FIG. 19 is a diagram showing a sensor element having a primary coating surrounded by a liquid coating.

FIG. 19 shows a cross section of an optical fibre 190 with a core 191, a cladding region 192, a coating 193, a liquid coating 184 and a container 185.

Figure 20:
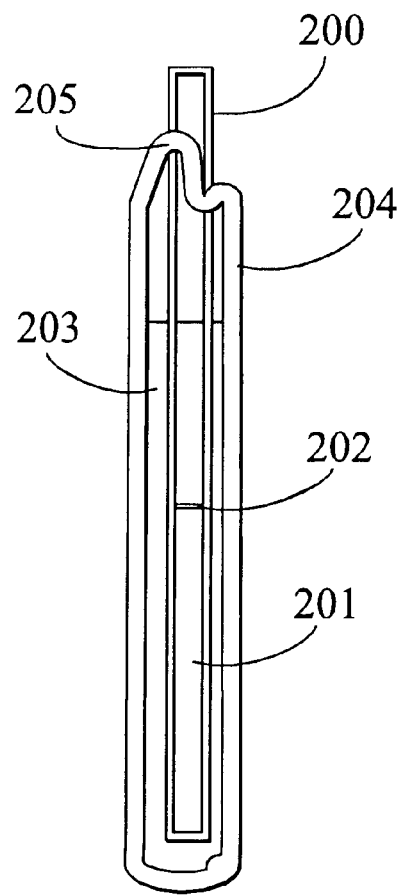
FIG. 20 is a diagram showing an optical fibre cable joined to an optical fibre sensor at a splice surrounded by a liquid coating.

FIG. 20 shows an optical fibre cable 200 joined to an optical fibre sensor 201 at a splice 202 that is surrounded by a liquid coating 203 inside a container 204 which can be a flexible container, a capillary or a flexible capillary. The container 204 is shown attached to the optical fibre cable 200 at attachment location 205. The attachment can be achieved using adhesives, clamps or heat shrink sleeve.

The container 204 can be a sealed container, a container open at one end, or a container open at both ends.

The container 204 can be made of a material such as polytetrafluorethylene which can survive long-term exposure to temperatures of 300° C. or more, and which can be fabricated in the form of a convenient small diameter capillary form. This is particularly useful if the optical fibre sensor 201 is to be pumped through a conduit to a remote measurement location. A small diameter capillary constructed from polytetrafluorethylene can be designed to remain flexible and offer low friction during deployment of the optical fibre sensor 201 and the optical fibre cable 200 through the conduit.

Covering the splice 202 between the optical fibre sensor 201 and the optical fibre cable 200 by the liquid coating 203 reduces or prevents ingress of foreign molecules or ions. This protects the splice 202 and prevents or retards weakening of the splice 202. This is particularly important when optical fibres are to be used in hostile environments such as are found in oil and gas wells. Such protection is important, not only where an optical fibre sensor element may be joined to an optical fibre cable, but also when a cable is to be made up from two or more sections of optical fibre or where repairs are to be made to damaged sections of a cable.

The flexible container may be closed at one end, preferably at the lower end of the sensor assembly, effectively forming a flexible cup around the liquid coating 203. This may be useful in a case where it is desirable to cover a sensor element with a thicker layer than can be held in place by surface tension if the fibre is to be pumped through a conduit or highway or when the sensor element is in a remote location. In this case, the flexible container serves to retain the liquid coating 203 during transport of the sensor to the remote location and to prevent direct contact between the sensor body and the wall of the conduit or highway. The flexible container does not need to act as a hermetic barrier against the ingress of molecules or ions such as water or OH groups.

Figure 21:
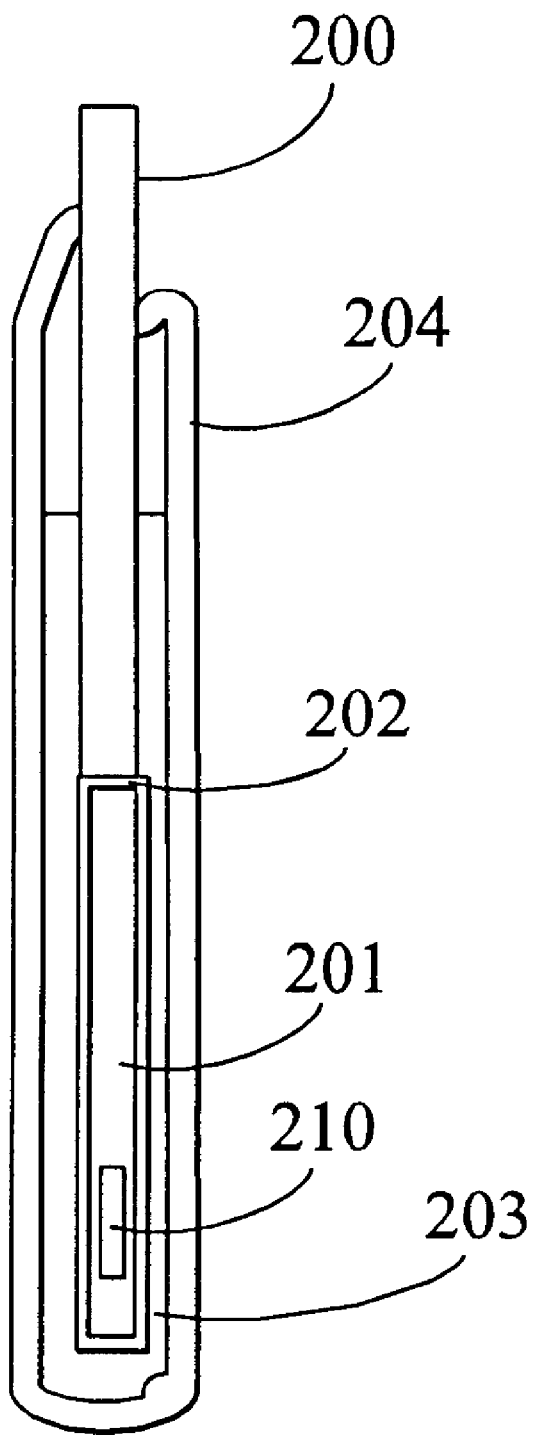
FIG. 21 is a diagram showing an optical fibre sensor comprising an optical fibre Bragg grating.

FIG. 21 shows an arrangement similar to FIG. 20 where the optical fibre sensor 201 comprises an optical fibre Bragg grating 210. It will be appreciated that the optical fibre sensor 201 can also comprise a plurality of optical fibre Bragg gratings 210 each operating at the same wavelength or at different wavelengths.

The optical fibre Bragg grating 210 may be an optical fibre pressure sensor in which the wavelength of the reflected light varies with applied pressure. The optical fibre Bragg grating 210 may be an optical fibre temperature sensor in which the wavelength of reflected light varies with applied temperature. It will be appreciated that a sensor may be constructed with two Bragg gratings operating at the same wavelength to form an optical fibre interferometer. The optical fibre interferometer can be an acoustic sensor, a seismic sensor. It will also be appreciated that the splice 202 may not always be necessary since it is possible to write a number of Bragg gratings into an optical fibre along a continuous section of the optical fibre.

The liquid coating 203 will not only protect the sensor, but can also protect splices between different segments of optical fibre.

The liquid coating 203 may be a metal which is in the liquid state at the temperatures where measurements are to be carried out.

A wide choice of metals or metal alloys is available to create a flexible barrier that reduces or prevents the ingress into the optical fibre sensor or cable of foreign molecules or ions such as water or OH groups or others. Such alloys are often characterised by two temperatures, the $T_{liquidus}$ or ($T_l$), above which the alloy behaves as a liquid and $T_{solidus}$ or ($T_s$), below which the alloy behaves as a solid. In the temperature range between $T_l$ and $T_s$, the alloy can sustain some constant stress without relaxation, but does not have the mechanical properties which are typical of the solid form.

Liquid metal are highly preferable for applications involving pumping optical fibre sensors and or cables to remote locations through conduits, highways and hydraulic control lines. Preferably the metal will be in the liquid or intermediate state in the temperature range experienced during the deployment of the sensor and cable so that the sensor assembly will be highly flexible and able to move around small radius turns in the hydraulic control lines. This feature is desirable but not necessarily a precondition for use of a particular metal or alloy, since thin metal coatings can still allow the sensor to bend without cracking and destroying the barrier efficiency. When the sensor is in the position where measurement takes place, it is advantageous that the metal coating be in the liquid state because this helps to prevent the build-up of stresses which lead to errors in the sensor data.

Examples of liquid metals and alloys include indium, gallium, mercury or alloys which include indium, gallium, tin or bismuth. Particular examples of alloys which have low melting points are:

(62.5% Ga, 22.5% In, 16% Sn) $T_l$=10.7° C.

(51% In, 32.5% Bi, 16.5% Sn) $T_l$=60° C.

In table 1 we give further non-limiting examples of alloys.

TABLE 1

| $T_{solid}$ °C. | $T_{liquid}$ °C. | Bi % | Pb % | Sn % | Ag % | Cd % | Ga % | In % |
|---|---|---|---|---|---|---|---|---|
| 10.7 | 10.7 | | | 16 | | | 62.5 | 21.5 |
| 15.7 | 15.7 | | | | | | 75.7 | 24.5 |
| 25 | 15.7 | | | | | | 95 | 5 |
| 29.8 | | | | | | | 100 | |
| 43 | 38 | 42.9 | 21.7 | 7.79 | | 5.09 | | 18.33* |
| 47 | 47 | 44.7 | 22.6 | 8.3 | | 5.3 | | 19.1 |
| 52 | 47 | 44.7 | 22.6 | 11.3 | | 5.3 | | 16.1 |
| 60 | 60 | 32.5 | | 16.5 | | | | 51 |
| 69 | 58 | 49 | 18 | 15 | | | | 18 |
| 72 | 72 | 33.7 | | | | | | 66.3 |
| 73 | 70 | 50 | 24.95 | 12.5 | .05 | 12.5 | | |
| 73 | 70 | 50 | 25 | 12.5 | | 12.5 | | |
| 77.7 | 77.5 | 48.5 | | | | 10 | | 41.5 |

TABLE 1-continued

| $T_{solid}$ °C. | $T_{liquid}$ °C. | Bi % | Pb % | Sn % | Ag % | Cd % | Ga % | In % |
|---|---|---|---|---|---|---|---|---|
| 82 | 77 | 50 | 39 | 3 | | 8 | | |
| 88 | 71 | 42.5 | 37.7 | 11.3 | | 8.5 | | |
| 89 | 80 | 50.3 | 39.2 | 1.5 | | 7.99 | | 1 |
| 93 | 73 | 50 | 39 | 4 | | 7 | | |

*Plus 4% Hg.

It should also be noted that it can be useful to include scavenging or gettering additions to the metal alloys so as to remove any oxygen or hydrogen or water molecules which may enter the liquid coating in small quantities. Removing these molecules will further improve the effectiveness of the liquid coating in reducing or preventing ingress of these molecules into the structure of the optical fibre sensors or optical fibre cables. The optical fibre sensors and cables may be constructed from silica-based optical fibre components, soft-glass-based optical fibre components, or sapphire-based optical fibre components. These materials are typically doped during manufacture to form waveguiding structures. Non-limiting examples of scavengers or getters include elements from Group I, excluding hydrogen. (Li, Na, K, Rb, Cs, but most likely Li or Na.). Alternately candidates include elements from Group II. (Be, Mg, Ca, Sr, Ba, but most likely Mg or Ca).

The choice of metal may be influenced by the fluid which is chosen for deployment and the fluid which is chosen during measurement, since this can determine the possible chemical reactions between the coating metal or alloy and the surrounding fluid environment inside the conduit. By deployment we mean pumping sensors and cables through at least one conduit, highway, control line or other tubular or pipe-like structures.

Figure 22:
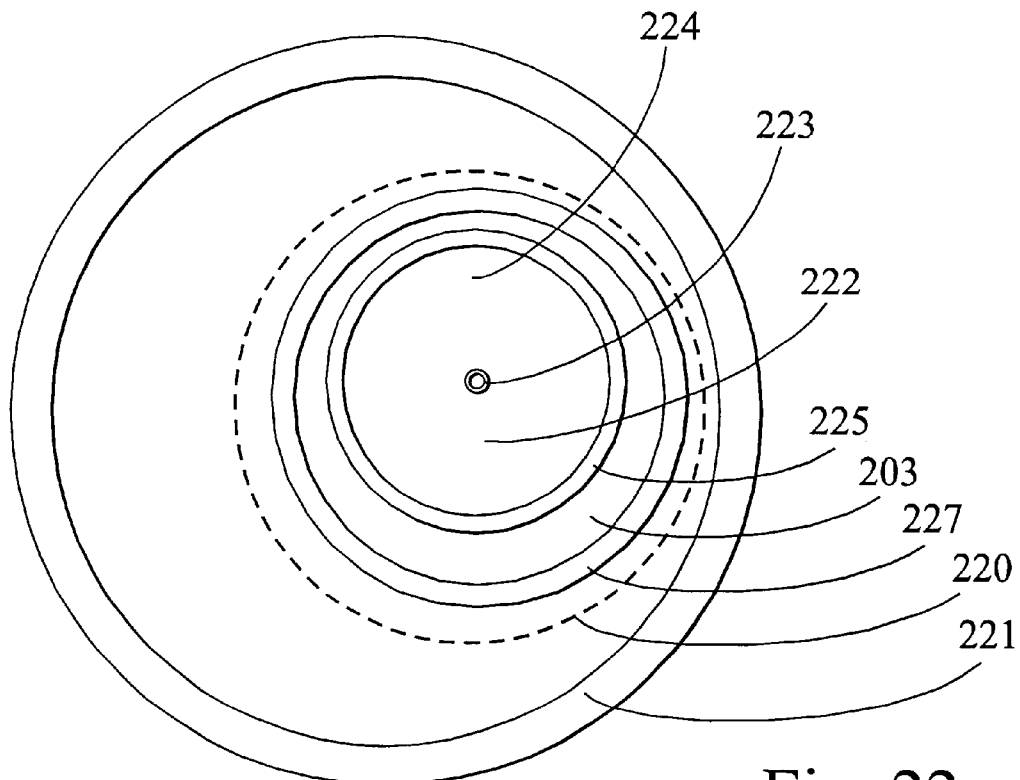
FIG. 22 is a diagram showing a sensor element inside a conduit.

FIG. 22 shows a cross section of a sensor element 220 of such dimensions and structure that it can be placed inside a conduit 221. The sensor element 220 comprises an optical fibre transducer 222 with a waveguiding region 223, a cladding region 224, a primary coating 225, a liquid coating 203 and a container 227. The conduit 221 may be a hydraulic control line such as ¼" hydraulic control line commonly used in the oil and gas production industry. It may also be convenient to use a conduit of a smaller diameter or a larger diameter. The conduit 221 may also be a tube, a pipe and may be constructed from polymers or metals depending on the application.

Figure 23:
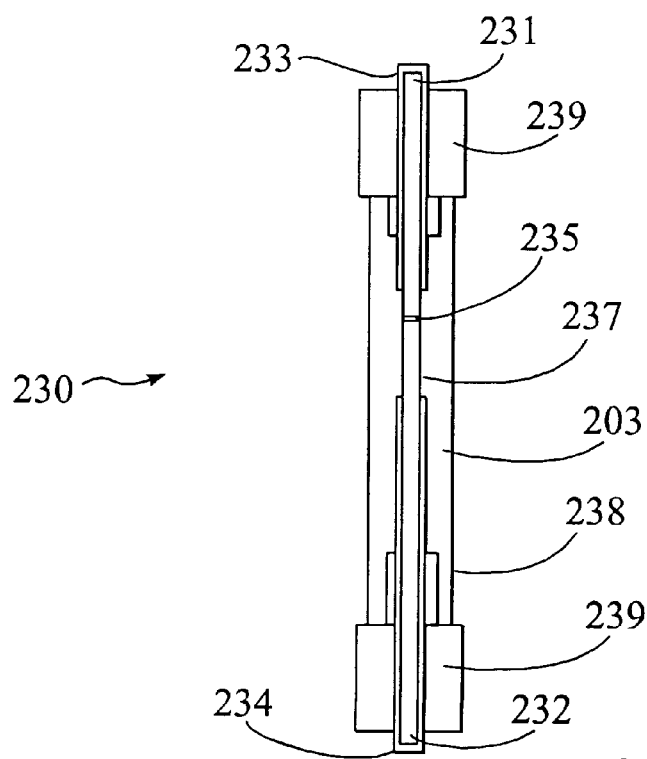
FIG. 23 is a diagram showing a packaged splice.

FIG. 23 shows a packaged splice 230 between a first optical fibre 231 and a second optical fibre 232. The first optical fibre 231 comprises a first coating 233. The second optical fibre 232 comprises a second coating 234. A splice 235 joins the first and second optical fibres 231 and 232. The splice 235 can be a fusion splice. A liquid coating 203 is shown covering the splice 235 and a region 237 near the splice 235 where the first and second coatings 233 and 234 have been removed in order to enable the splice 235 to be formed. A container 238 which may be in the form of a capillary and may help protect the liquid coating 203 and prevents the liquid coating 203 from being removed. The container 238 is shown attached to the first and second coatings 233 and 234 of the first and second optical fibres 231 and 232 by an attachment 239. The attachment 239 can be adhesive, solder, a weld, a clamp, or conveniently by a heat shrink sleeve. The implementation is a non-limiting example and can readily be implemented by other means to achieve the splice protection and the anchoring of the container 238. Protection of splices in optical fibres which are to be used in demanding environments is important in that it prevents or retards weakening of the joint and allows use of sections of optical fibre which are in themselves too short to form the communication link but which can be joined together to achieve the full link length. It also allows optical fibre cables to be repaired in the event of damage to the cable.

Figure 24:
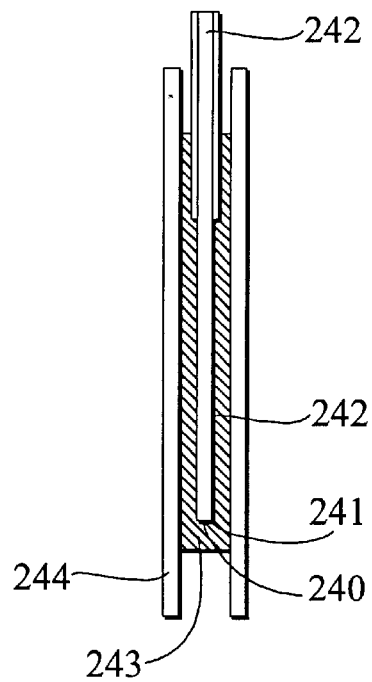
FIG. 24 is a diagram showing a mirror on the end of an optical fibre.

FIG. 24 shows a mirror 240 on an end 241 of an optical fibre 242 surrounded by a liquid metal 243 that is contained in a container 244. This embodiment is particularly useful for forming mirrors that can survive hostile environments such as found in oil and gas wells, refineries and process industries with good reliability.

The liquid metal 243 can be selected from the group comprising mercury, gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium. Gallium has been shown to work particularly well in hostile environments. A second fluid (not shown) can be provided between the liquid metal 243 and the hostile environment (not shown).

The end 241 of the optical fibre 242 can comprise a cleaved end of the optical fibre 242 or a coated end of the optical fibre 242. Thus the mirror 240 may be formed by the interface of the liquid metal 243 and the optical fibre 242 or may be already provided prior to inserting the optical fibre 242 into the liquid metal 243.

The mirror 240 may be part of an optical fibre sensor such as an interferometric or polarimetric fibre optic sensor.

The container 244 may be a capillary.

Figure 25:
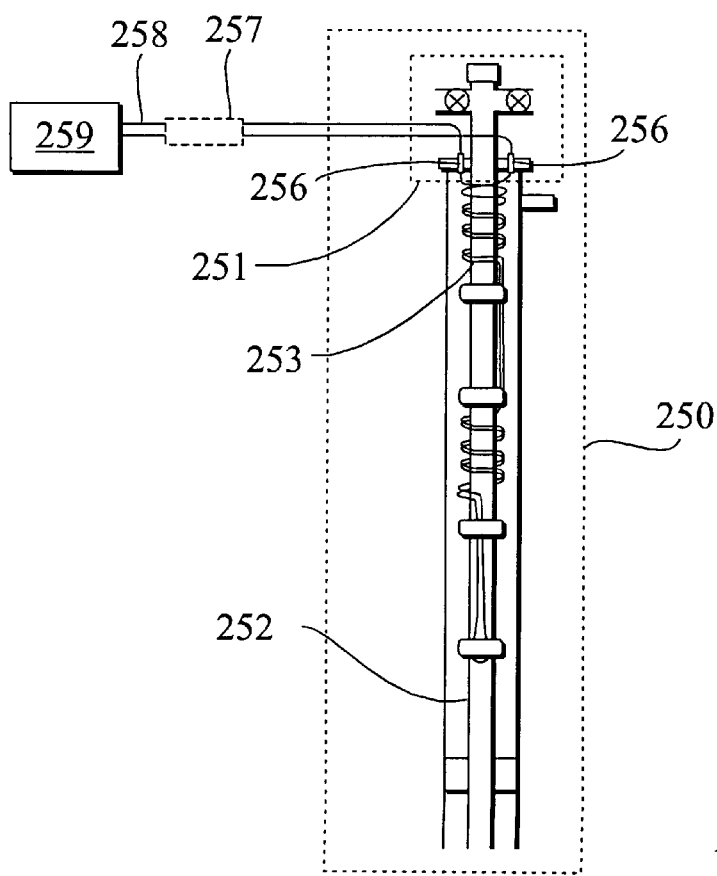
FIG. 25 is a diagram showing a well for extracting oil, gas, sulphur or geothermal energy.

FIG. 25 shows a well 250 for extracting at least one of oil, gas, sulphur or geothermal energy from below ground. The well 250 comprises a well head 251, a production tubing 252, a conduit 253. The conduit 253 contains at least one optical fibre cable 254 (not shown) attached or containing at least one sensor 255 (not shown) of such dimensions and structure that they can be placed inside the conduit 253. Examples of sensors attached to optical fibres are shown in FIGS. 3, 4 and 6.

This arrangement is particularly advantageous because the sensor 255 may be pumped along the conduit 253 to remote measurement locations and may be retrieved and replaced relatively easily.

The sensor 255 may be packaged according to one of the designs described earlier. It is preferred that the sensor 255 is packaged within a capillary and surrounded by liquid metal.

FIG. 25 also shows a penetrator 256 through which the conduit 253 passes through the well head 251. An optional high-pressure seal 257 is provided enabling an optical fibre cable 258 to pass from the conduit 253 through to an instrumentation 259. The instrumentation 259 is for interrogating the sensor 255 and making a measurement. The instrumentation may be for making measurements of distributed temperature, distributed pressure, acoustic energy, pressure or flow. An example of instrumentation used for distributed temperature is a York Distributed Temperature Sensor DTS80 instrumentation.

Figure 26A:
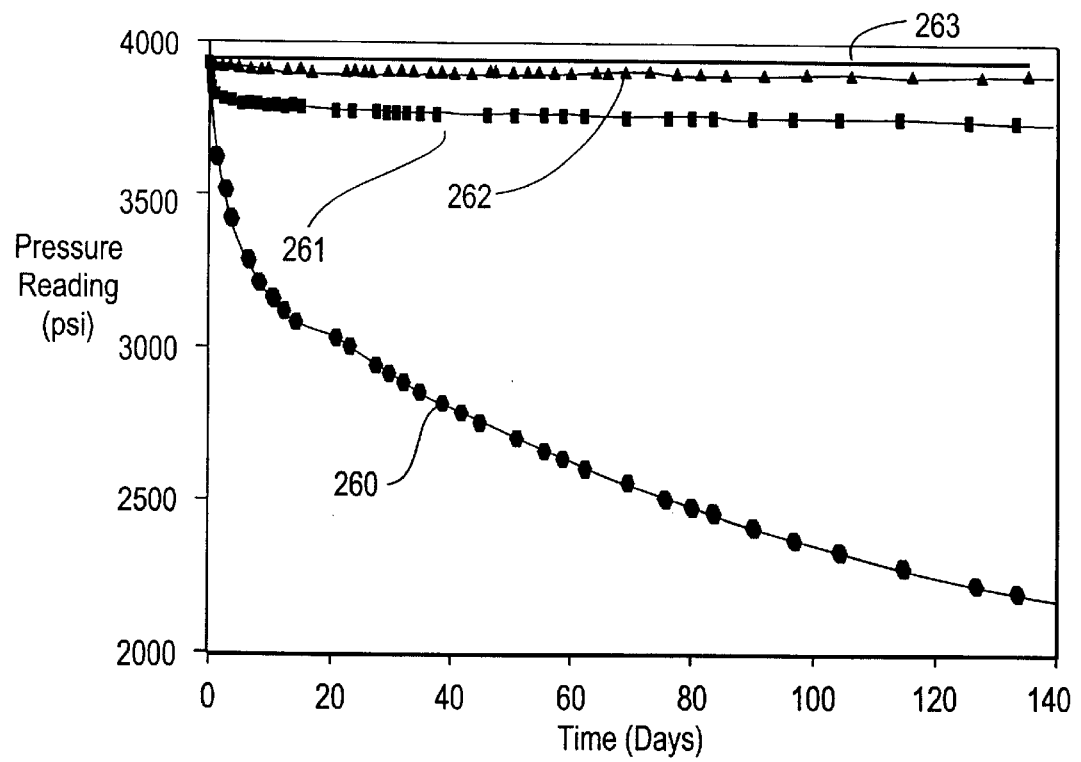
FIGS. 26a and 26b are diagrams showing stability results of pressure transducers
Figure 26B:
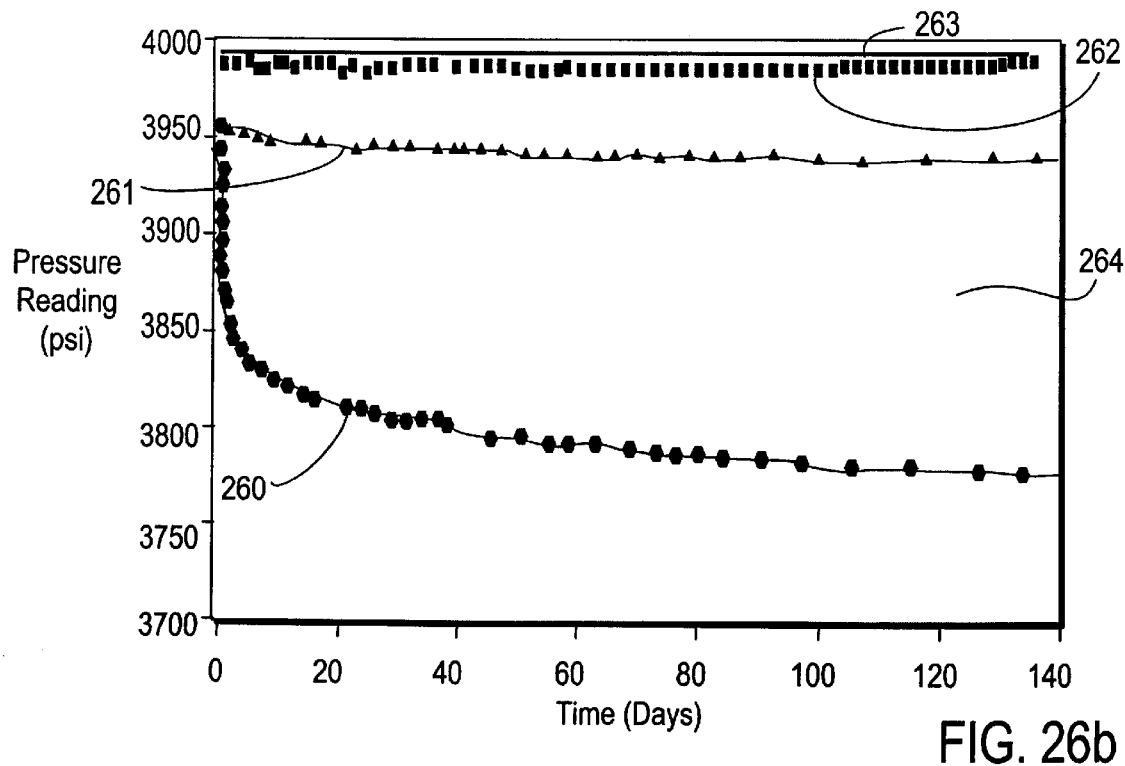

FIG. 26a shows stability results plotted as curves 260, 261, 262 and 263 for four silica fibre pressure transducers having various levels of protective coatings. FIG. 26b shows curves 261, 262 and 263 over a reduced pressure range. The transducers were accurately maintained at 4000 psi pressure and at 155° C. at all times. The graph shows the pressure reading from instrumentation which was used to interrogate the transducers versus elapsed time in days. If the transducer were stable, then the reading from the instrumentation would remain the same over time and there would be no drift.

The results shown are for pressure transducers based upon side-hole silica fibres. However, similar results would also be obtained with other pressure transducers such as those based on fibre Bragg grating or on Fabry Perot air gaps. The protected transducers were surrounded with a polysiloxane oil.

The transducer of curve 260 was an unprotected silica fibre pressure transducer—that is the transducer had no coating and the silica surface was in contact with the polysiloxane oil. The transducer of curve 261 was the same as the transducer of curve 260 but had a commercial carbon coating deposited over the silica surface of the transducer. The commercial carbon coating was in contact with the polysiloxane oil.

Figure 27:
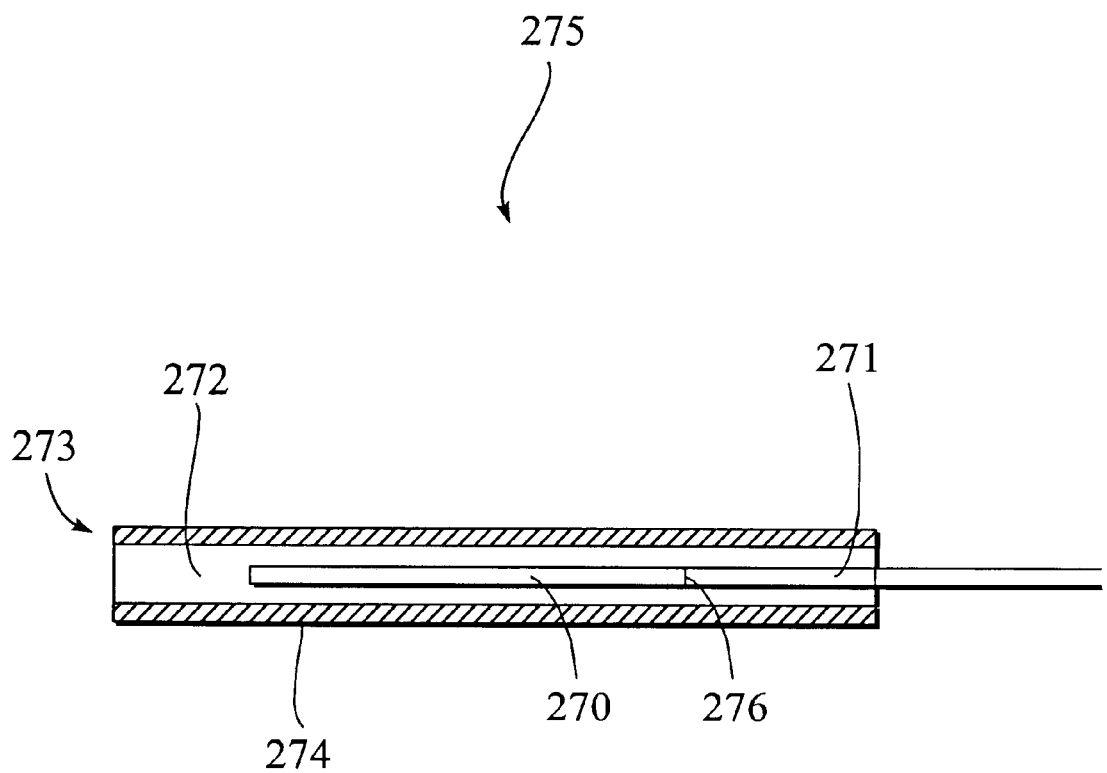
FIG. 27 is a diagram showing a package design for pressure transducers.

FIG. 27 shows a package design 275 for a pressure transducer 270 comprising the pressure transducer 270, an optical fibre cable 271 spliced to the pressure transducer 270 at splice 276, wherein the pressure transducer 270 and the splice 276 are surrounded by a liquid metal 272 and packaged in a container 273.

Referring to FIG. 26, the transducers of curve 262 and 263 were the same as the transducer of 260 but packaged according to the package design 275 with gallium chosen as the liquid metal 272 and a flexible silica capillary chosen as the container 273. The flexible silica capillary was coated with a high-temperature polymer 274 for mechanical protection. The high-temperature polymer 274 was polyimide, but other polymers or plastics could have been chosen instead.

The transducer of curve 263 was pre-treated at elevated temperature prior to the measurement results shown in FIG. 26 being taken.

Figure 28:
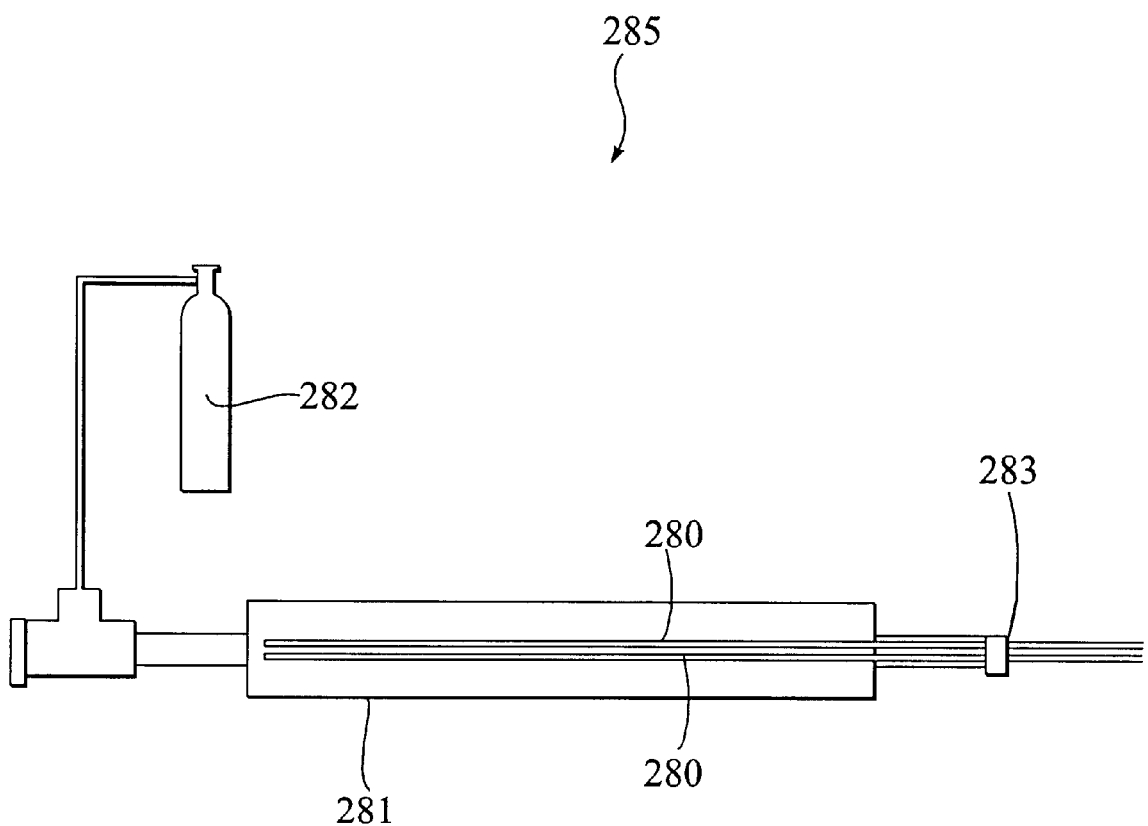
FIG. 28 is a diagram showing apparatus for pre-treatment of optical fibre transducer or sensors.

FIG. 28 shows a non-limiting example of an apparatus 285 used for pre-treatment of optical fibre transducers or sensors at elevated temperatures. At least one packaged transducer 280 such as shown in FIG. 27 is placed in a substantially air tight temperature chamber 281 having a port 283 which may be a valve. The chamber 281 is nitrogen purged from an oxygen free nitrogen source, 282, to maintain an oxygen free environment inside the chamber 281. This can be achieved by continuous nitrogen flow through the chamber 281 when the port 283 is left open.

The apparatus 285 was used to pre-treat the transducer corresponding to the results shown in curve 263, FIG. 26. The treatment was for a duration of 10 days and was carried out at 400° C. However, these values are intended to be non-limiting and various other temperatures from 60° C. through to 600° C. are believed to be suitable, with durations from around 1 day through to several months or more.

Unprotected silica fibre cables and pressure transducers are severely affected by high temperature and pressure fluid conditions found in oil wells. In the case of pressure transducers, the result is a long term drift in the measured pressure reading of the transducer. This is demonstrated by the curve 260, FIG. 26 where the transducer reading drifts by approximately 1800 psi in 140 days.

Commercial carbon coatings improve the stability of pressure transducers in high temperature and pressure fluids. Curve 261, FIG. 26 shows this improvement for a carbon coated pressure transducer and the inset, 264 shows an expanded pressure scale for this curve. Curve 261 shows a drift of approximately 220 psi in 140 days and a stability of only 7 psi per month after a month of testing.

Curve 262 demonstrates the effectiveness of liquid metal coatings. The transducer stability is much improved over unprotected silica transducers and carbon coated transducers. A stability of approximately 1 psi per month is demonstrated by this transducer following the first month of testing.

Pre-treatment of the silica transducer in a liquid gallium package (transducer of curve 263) improves the performance of the transducer further still. Curve 263 of FIG. 26, shown more clearly on inset 264, shows an extremely low drift over almost 140 days of testing under 4000 psi and at 155° C. The stability of this transducer is better than 0.1 psi per month and this is believed to be attributable to the instrumentation used and not the transducer.

Figure 29:
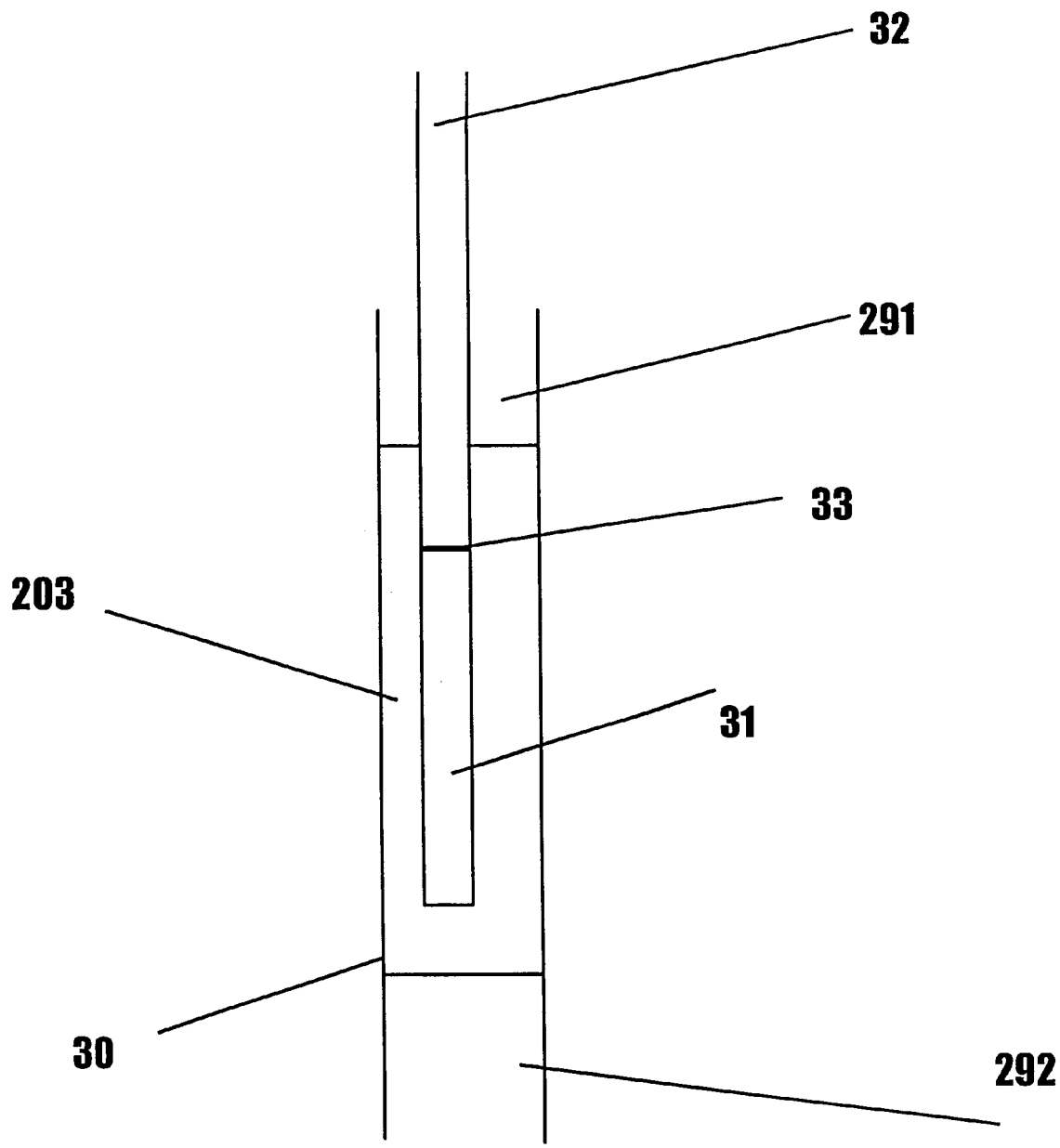
FIG. 29 is a diagram showing a liquid coating isolated from a harsh environment by a first buffer and a second buffer

FIG. 29 shows an optical fibre sensor 31 connected to a cable 32 at a splice region 33. The optical fibre sensor 31 and the splice region 33 are surrounded by a liquid coating 203 which is contained in a container 30. A first buffer 291 and a second buffer 292 isolate the liquid coating 203 from a harsh environment (not shown).

The liquid coating 203 can be a liquid metal which may be gallium. The first and second buffers 291 and 292 can be fluids such as an oil or a grease. The first and second buffers 291 and 292 can be epoxies. The first and second buffers 291 and 292 can be the same material or different materials.

It is believed that these results demonstrate a breakthrough in the protection of devices used in hostile environments and the techniques will be applicable to a wide range of optical and electrical gauges, fibres, wires and other devices.

It is to be appreciated that the embodiments of the invention described above with reference to the accompanying drawings have been given by way of example only and that modifications and additional components may be provided to enhance the performance of the apparatus. The above mentioned features of the invention can be taken singularly or in any combination.

What is claimed is:

1. Apparatus for operating in a hostile environment comprising an optical device and a protective liquid wherein the protective liquid substantially surrounds the optical device such that when the apparatus is operated in the hostile environment the optical device is afforded protection so that the performance of the optical device is not substantially degraded.

2. Apparatus according to claim 1 and further comprising a cable and a capillary, wherein the optical device is an optical fibre sensor connected in series with the cable, the cable is an optical fibre cable, the protective liquid is gallium, and wherein the capillary substantially contains the optical fibre sensor and the gallium.

3. Apparatus according to claim 2 comprising a plurality of optical fibre sensors substantially surrounded by gallium, wherein the optical fibre sensors are contained in at least one capillary.

4. Apparatus according to claim 2 wherein the optical fibre sensor is selected from the group consisting of an optical fibre pressure sensor, an optical fibre acoustic sensor, an optical fibre temperature sensor, an optical fibre seismic sensor, a distributed optical fibre temperature sensor, a distributed optical fibre pressure sensor, an optical fibre flow sensor, and an optical fibre sensor comprising at least one optical fibre Bragg grating.

5. Apparatus according to claim 1 wherein the optical device is a transducer and the protective liquid is a liquid metal.

6. Apparatus according to claim 5 wherein the liquid metal is gallium.

7. Apparatus according to claim 5 wherein the liquid metal is selected from the group comprising mercury, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

8. Apparatus according to any one of claims 5–7, wherein the transducer is an optical fibre sensor.

9. Apparatus according to any one of claims 5 to 7 and further comprising a cable connected to the transducer.

10. Apparatus according to any one of claim 1, 5, 6, or 7 and further comprising a first container wherein the liquid is substantially contained within the first container.

11. Apparatus according to claim 10 wherein the container is a sealed container.

12. Apparatus according to claim 10 wherein the container is a first capillary.

13. Apparatus according to claim 12 wherein the first capillary is a flexible capillary.

14. Apparatus according to claim 13 and further comprising a second capillary substantially containing the flexible capillary.

15. Apparatus according to claim 14 wherein the second capillary contains a second liquid.

16. Apparatus according to claim 15 wherein the second liquid is selected from the group consisting of a liquid metal, silicone oil, siloxane oil, polysiloxane oil, hydrocarbon oil, hydrocarbon fluid, grease and a gel.

17. Apparatus according to claim 1 wherein the optical device is selected from the group consisting of a transducer, a cable, an optical fibre cable, a region disposed about a splice in a cable, a region disposed about a splice between a cable and a transducer.

18. Apparatus according to claim 1 wherein the protective liquid is selected from the group consisting of liquid metal, grease and oil.

19. Apparatus according to claim 18 wherein the liquid metal is selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

20. Apparatus according to claim 1 further comprising a scavenger.

21. Apparatus according to claim 20 wherein the scavenger is selected from the group consisting of lithium and sodium.

22. Apparatus according to claim 1 further comprising a first container wherein the liquid is substantially contained within the first container.

23. Apparatus according to claim 22 wherein the first container is a sealed container.

24. Apparatus according to claim 22 wherein the first container is a capillary.

25. Apparatus according to claim 22 further comprising a second container wherein the first container is substantially contained within the second container.

26. Apparatus according to claim 25 and further comprising a second liquid wherein the second liquid is substantially contained within the second container.

27. A method for protecting an optical device from a hostile environment comprising providing a protective liquid and substantially surrounding an optical device with the liquid;
and positioning the protective liquid and optical device in a hostile environment;
wherein the protective liquid protects the optical device from the hostile environment such that the performance of the optical device is not substantially degraded.

28. A method according to claim 27 in which the optical device is a transducer and in which the transducer is surrounded by the liquid in an oil, gas or geothermal well.

29. A method according to claim 28 wherein the transducer is an optical fibre transducer and further comprising an optical fibre cable connected in series with the optical fibre transducer.

30. A method according to claim 27 wherein the liquid is a liquid metal selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

31. A method according to claim 29 further providing a capillary to contain the liquid and the optical fibre transducer.

32. A method according to claim 28 wherein the transducer is a pressure sensor.

33. Apparatus according to claim 1 wherein the optical device is an optical fibre cable comprising an optical fibre and a capillary wherein the optical fibre is contained within the capillary and the protective liquid surrounds the optical fibre.

34. Apparatus according to claim 33 wherein the protective liquid is a liquid metal selected from the group comprising gallium, indium, an alloy that includes indium and gallium, an alloy that includes indium and tin, an alloy that includes indium and bismuth, an alloy that includes gallium and tin, an alloy that includes gallium and bismuth, and an alloy that includes cadmium.

35. Apparatus according to claim 1 and in the form of an optical fibre splice comprising a first optical fibre, a second optical fibre, a fusion splice, a capillary and the protective liquid wherein the first and the second optical fibres are connected together at the fusion splice, and wherein the protective liquid surrounds the fusion splice and wherein the capillary contains the protective liquid around the fusion splice.

36. Apparatus according to claim 1 and in the form of a transducer comprising an optical fibre transducer, the protective liquid and a capillary wherein the capillary contains the protective liquid and wherein the protective liquid surrounds the optical fibre transducer.

37. An oil, gas or geothermal well when including apparatus according to claim 1.

38. An oil, gas or geothermal well according to claim 37 and further comprising a conduit extending from the surface to a measurement location and in which the optical device is a transducer.

39. An oil, gas or geothermal well according to claim 38 and further comprising an optical fibre cable connected in series with the transducer wherein the optical fibre cable is substantially located within the conduit.

40. An oil, gas or geothermal well according to claim 38 or 39 wherein the transducer is located within the conduit by pumping the transducer along the conduit.

41. Apparatus for communicating pressure comprising a first port, a second port and a liquid metal, in which the liquid metal provides an interface between the first port and the second port.

42. Apparatus for measuring pressure comprising a first port, a liquid metal and a pressure sensor in which the liquid metal transfers pressure from the first port to the pressure sensor.

43. Apparatus for measuring pressure at a measurement location comprising a first chamber, a pressure sensor, a capillary and a liquid metal, in which the pressure sensor is contained in the first chamber, which is connected to the location where pressure is to be measured by the capillary and the liquid metal.

44. Apparatus according to claim 43 in which the first chamber contains an oil.

45. Apparatus according to claim 44 in which the oil is chosen from the group silicone oil and polysiloxane oil.

46. Apparatus according to claim 43 in which the first chamber contains a liquid metal.

47. Apparatus according to claim 43 in which the capillary contains a liquid metal.

48. Apparatus according to claim 43 in which the liquid metal is chosen from the group gallium, indium gallium, indium.

49. Apparatus according to any one of claims 43–48 and further comprising a second chamber and a port to the measurement location and in which second chamber contains a liquid metal.

50. A mirror formed on an optical fibre comprising an optical fibre and a liquid metal wherein the optical fibre has a cleaved end face and wherein the liquid metal is in contact with the cleaved end face of the optical fibre.

51. A mirror according to claim 50 wherein the liquid metal is gallium.

* * * * *